(12) United States Patent  
Luther

(10) Patent No.: US 8,528,853 B2  
(45) Date of Patent: Sep. 10, 2013

(54) IN-LINE STAGED HORIZONTAL TAKEOFF AND LANDING SPACE PLANE

(76) Inventor: David I. Luther, Mesa, AZ (US)

(*) Notice: Subject to any disclaimer, the term of this patent is extended or adjusted under 35 U.S.C. 154(b) by 49 days.

(21) Appl. No.: 13/190,675

(22) Filed: Jul. 26, 2011

(65) Prior Publication Data

US 2012/0025006 A1  Feb. 2, 2012

Related U.S. Application Data

(60) Provisional application No. 61/368,990, filed on Jul. 29, 2010.

(51) Int. Cl.
*B64C 37/02* (2006.01)

(52) U.S. Cl.
USPC ...... 244/2; 244/158.1; 244/158.9; 244/159.3; 244/171.1; 244/171.4; 244/63

(58) Field of Classification Search
USPC ............... 244/2, 158.1, 158.9, 159.3, 171.1, 244/171.3, 171.4, 63
See application file for complete search history.

(56) References Cited

U.S. PATENT DOCUMENTS

| | | | | |
|---|---|---|---|---|
| 2,981,499 A * | 4/1961 | Janney, II | ........................... | 244/2 |
| 3,142,458 A * | 7/1964 | Byrne et al. | ..................... | 244/63 |
| 3,202,381 A * | 8/1965 | Wuenscher | ................. | 244/159.3 |
| 3,258,228 A * | 6/1966 | Crook | ............................... | 244/46 |
| 3,261,571 A * | 7/1966 | Pinnes | ........................ | 244/159.3 |
| 3,289,974 A * | 12/1966 | Cohen et al. | ................ | 244/159.3 |
| 3,369,771 A * | 2/1968 | Walley et al. | .............. | 244/159.3 |
| 3,419,234 A * | 12/1968 | Poirier | ........................ | 244/137.1 |
| 3,516,624 A * | 6/1970 | Crook | ................. | 244/2 |
| D220,983 S * | 6/1971 | Becker et al. | ................ | D12/334 |
| 3,700,193 A | 10/1972 | Bradley | | |
| 3,702,688 A | 11/1972 | Faget | | |
| 3,753,536 A * | 8/1973 | White | ........................ | 244/172.5 |
| 3,866,863 A | 2/1975 | von Pragenau | | |
| 3,999,728 A * | 12/1976 | Zimmer | ........................ | 244/140 |
| 4,265,416 A | 5/1981 | Jackson et al. | | |
| 4,451,017 A * | 5/1984 | Marshall | ..................... | 244/172.2 |
| 4,452,412 A | 6/1984 | von Pragenau | | |
| 4,471,926 A * | 9/1984 | Steel, III | ..................... | 244/171.1 |
| D291,555 S * | 8/1987 | Rosenthal | ..................... | D12/334 |
| 4,802,639 A * | 2/1989 | Hardy et al. | ..................... | 244/2 |
| D302,148 S | 7/1989 | Gogakis | | |
| 4,901,949 A | 2/1990 | Elias | | |
| 5,031,857 A * | 7/1991 | MacConochie et al. | ...... | 244/3.28 |
| 5,507,451 A * | 4/1996 | Karnish | ............................. | 244/2 |
| 5,526,999 A * | 6/1996 | Meston | ............................. | 244/2 |
| 5,564,653 A | 10/1996 | Ohayon | | |
| D405,750 S * | 2/1999 | Clapp et al. | .................. | D12/319 |
| 6,119,985 A * | 9/2000 | Clapp et al. | .................. | 244/171.4 |
| 6,193,187 B1 * | 2/2001 | Scott et al. | ........................ | 244/2 |
| 6,257,527 B1 * | 7/2001 | Redding et al. | ............ | 244/159.1 |
| 6,360,994 B2 * | 3/2002 | Hart et al. | .................. | 244/171.3 |

(Continued)

*Primary Examiner* — Tien Dinh
*Assistant Examiner* — Assres H Woldemaryam
(74) *Attorney, Agent, or Firm* — PCT Law Group

(57) ABSTRACT

A vehicle includes a first sub-vehicle, and a second sub-vehicle which is repeatably moveable between coupled and uncoupled conditions with the first sub-vehicle. The first and second sub-vehicles each include a landing system and propulsion system. The first and second sub-vehicles are in the coupled condition during take-off. The first and second sub-vehicles are separately flyable in the uncoupled condition. Both vehicles are launched horizontally, by a ramp, or vertically, using atmospheric lift to achieve atmospheric flight, orbital, or sub-orbital launch.

19 Claims, 28 Drawing Sheets

(56) References Cited

U.S. PATENT DOCUMENTS

| | | | |
|---|---|---|---|
| 6,530,543 B2 * | 3/2003 | Redding et al. | 244/159.1 |
| 6,568,639 B2 * | 5/2003 | Carpenter et al. | 244/158.5 |
| 6,612,522 B1 | 9/2003 | Aldrin et al. | |
| 6,685,141 B2 * | 2/2004 | Penn | 244/171.1 |
| 6,776,373 B1 * | 8/2004 | Talmage, Jr. | 244/140 |
| 6,966,524 B2 * | 11/2005 | Stuhr | 244/53 B |
| 7,080,809 B2 * | 7/2006 | Hall | 244/172.2 |
| 7,252,270 B2 * | 8/2007 | Mitzmacher | 244/171.3 |
| 7,484,692 B1 * | 2/2009 | McKinney et al. | 244/172.3 |
| 7,654,489 B2 * | 2/2010 | Stephenson | 244/159.3 |
| 2005/0230517 A1 * | 10/2005 | Troy | 244/2 |
| 2006/0219846 A1 * | 10/2006 | Johnson et al. | 244/158.9 |
| 2007/0012820 A1 * | 1/2007 | Buehler | 244/158.9 |
| 2009/0159063 A1 * | 6/2009 | Hippely | 124/64 |
| 2009/0173830 A1 * | 7/2009 | Cormier | 244/159.3 |
| 2009/0302166 A1 * | 12/2009 | Meyers | 244/158.9 |

* cited by examiner

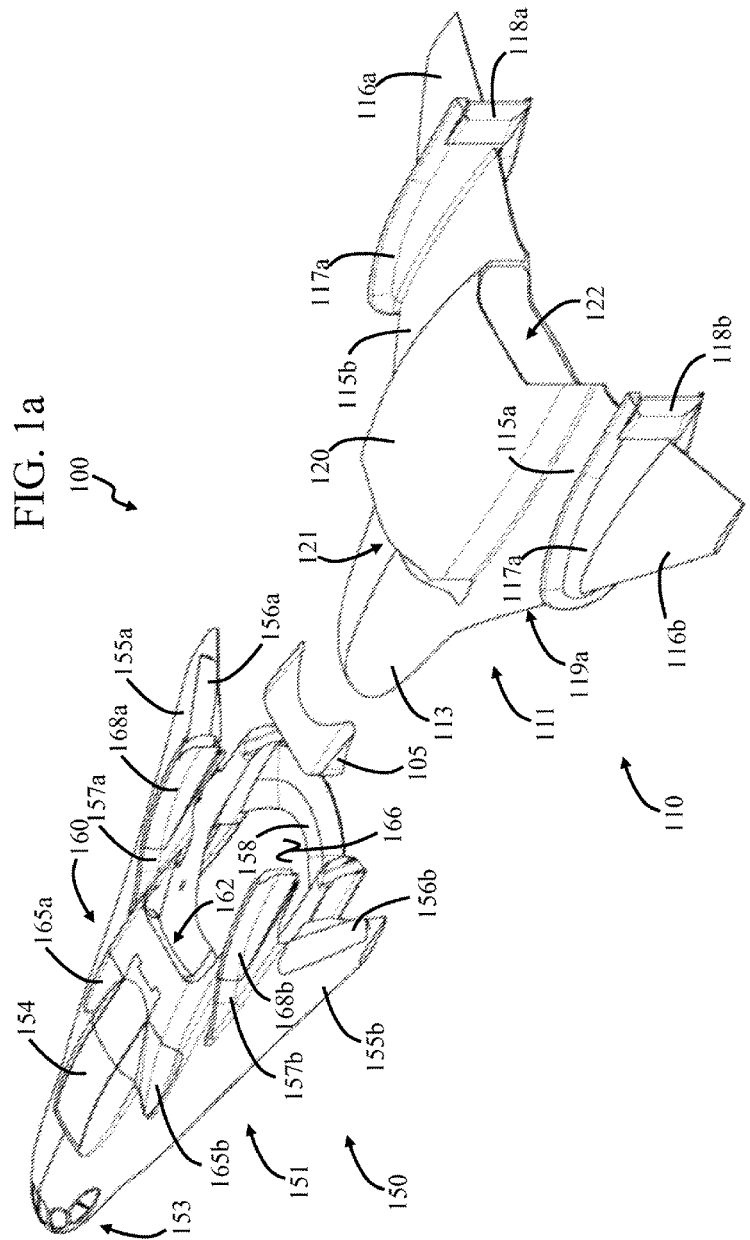

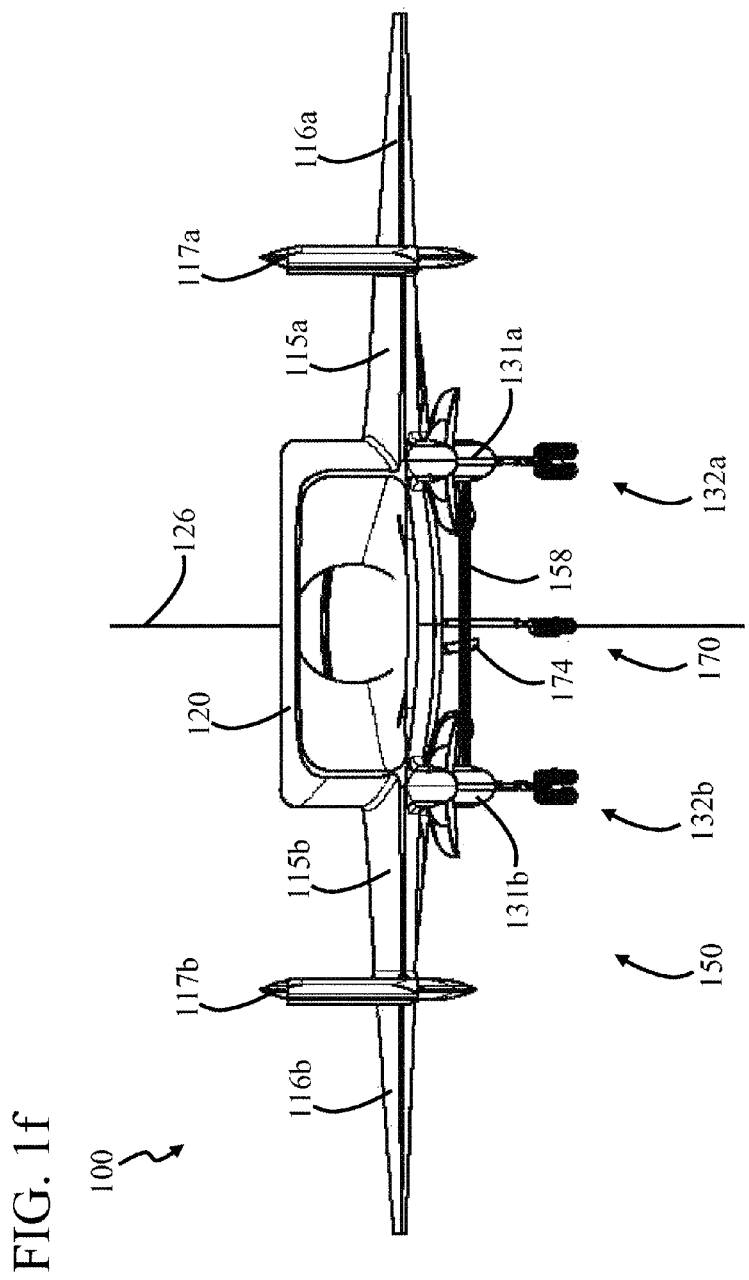

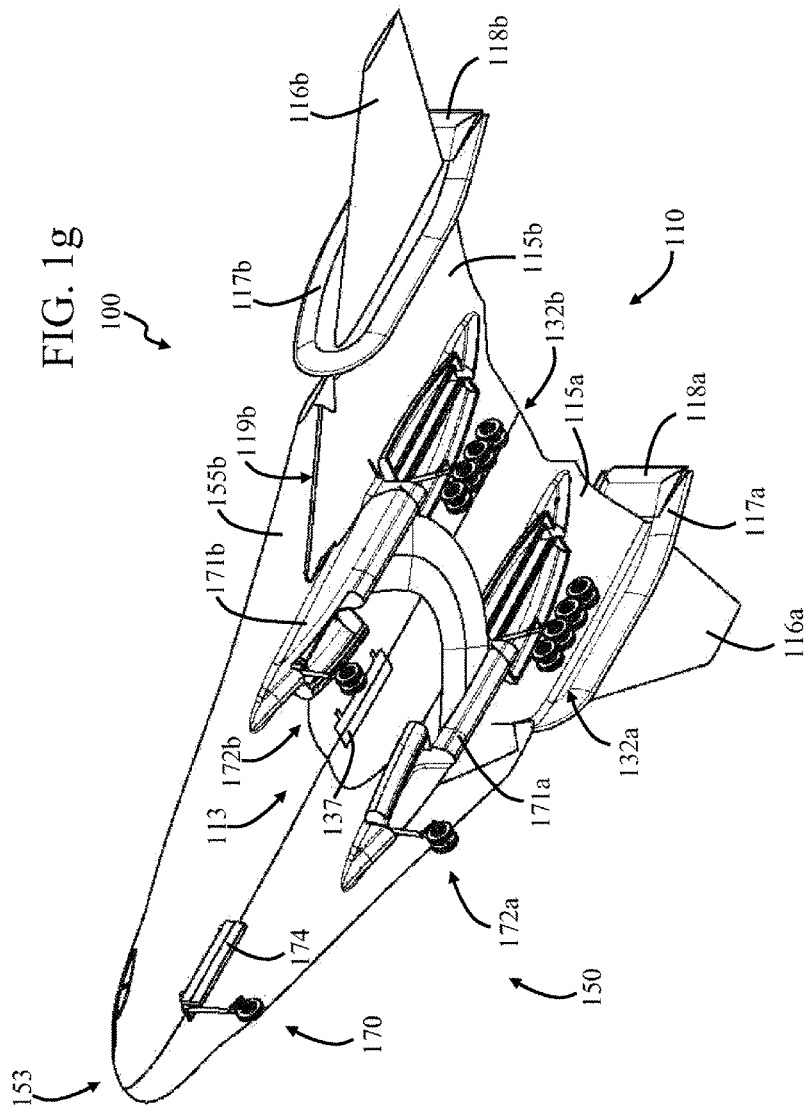

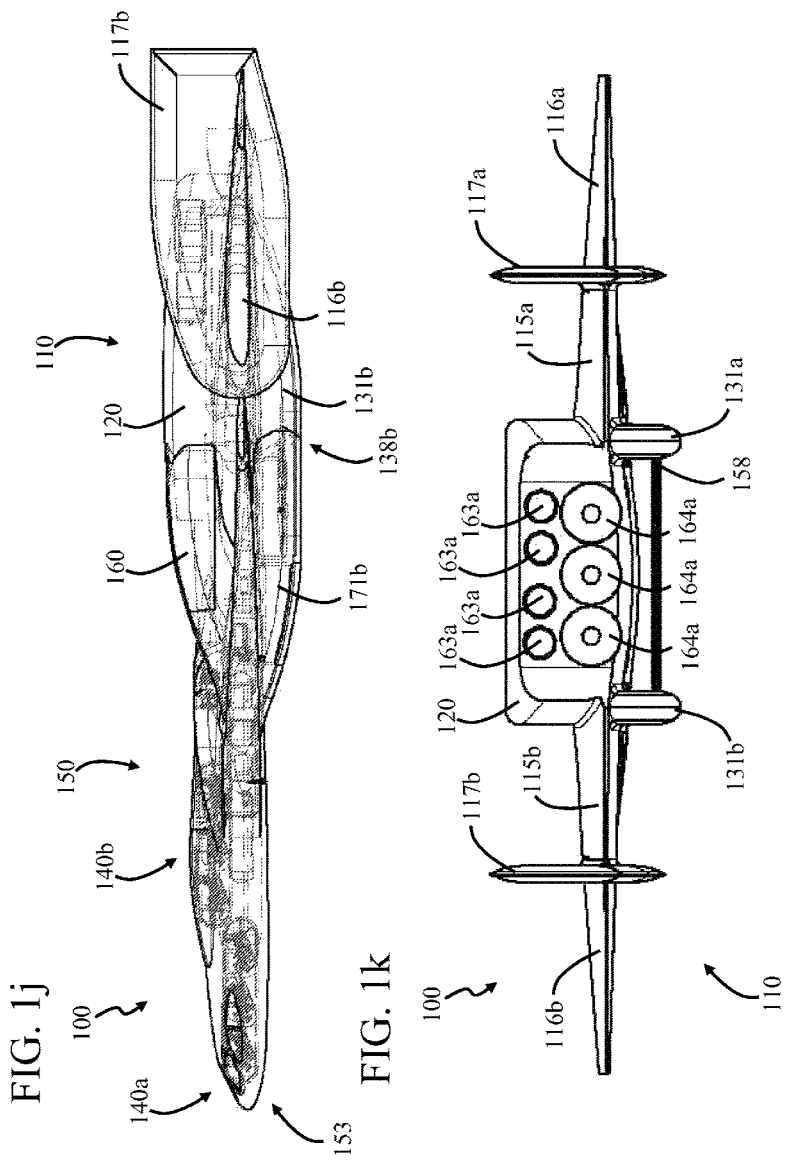

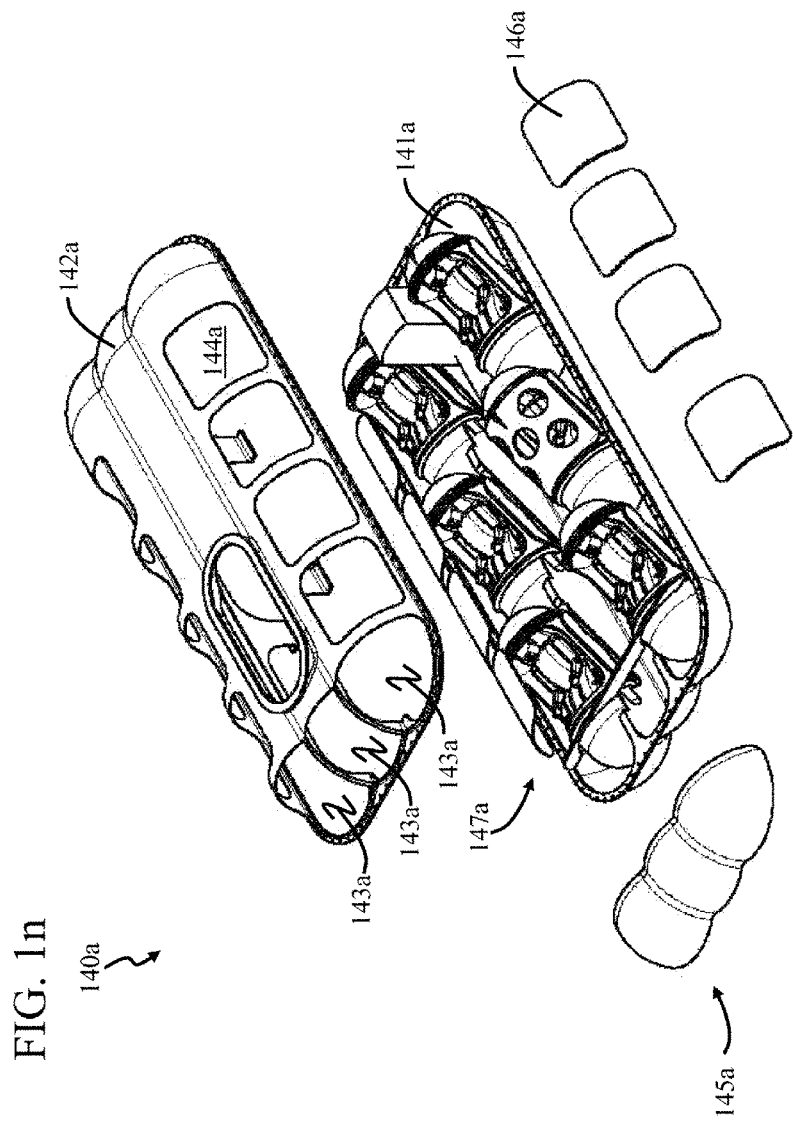

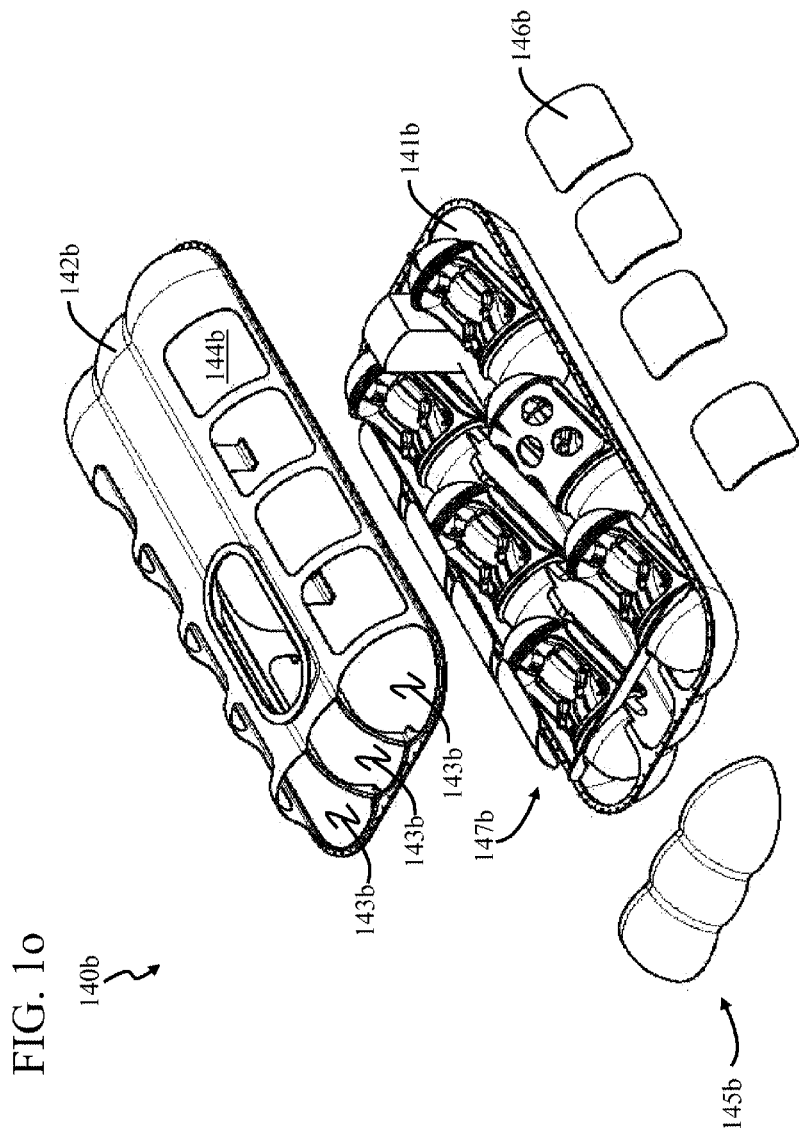

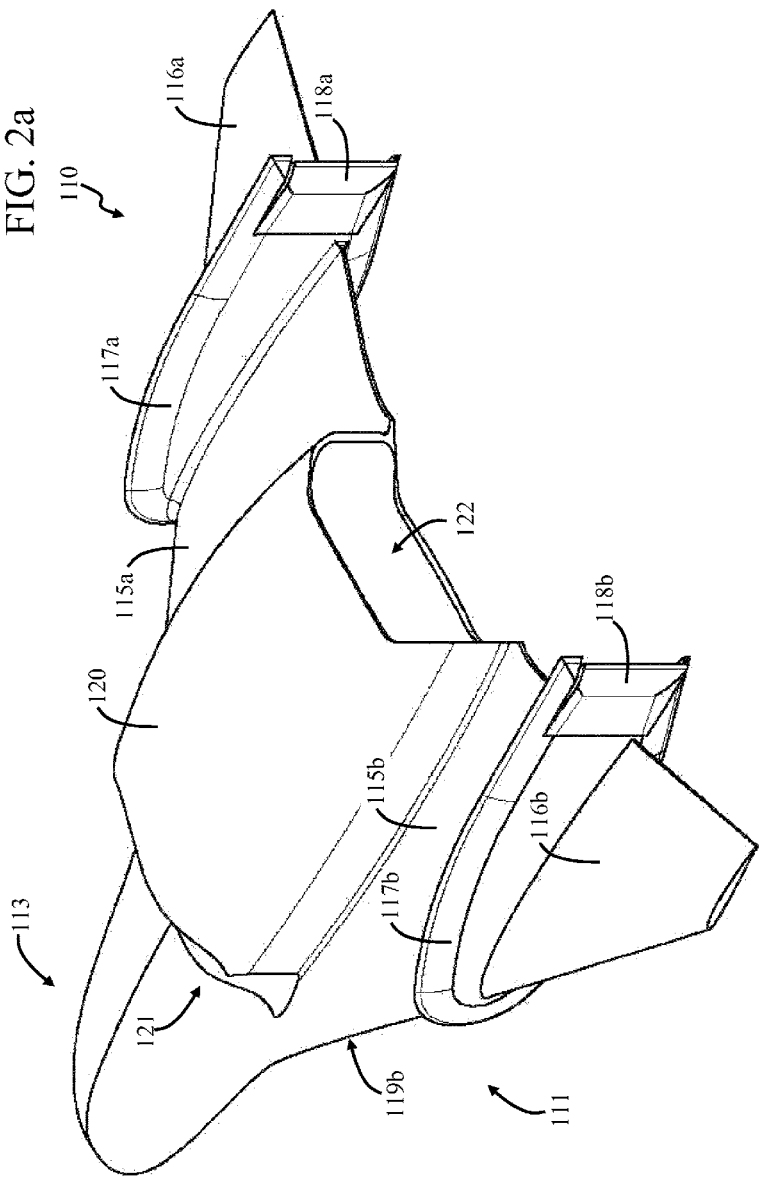

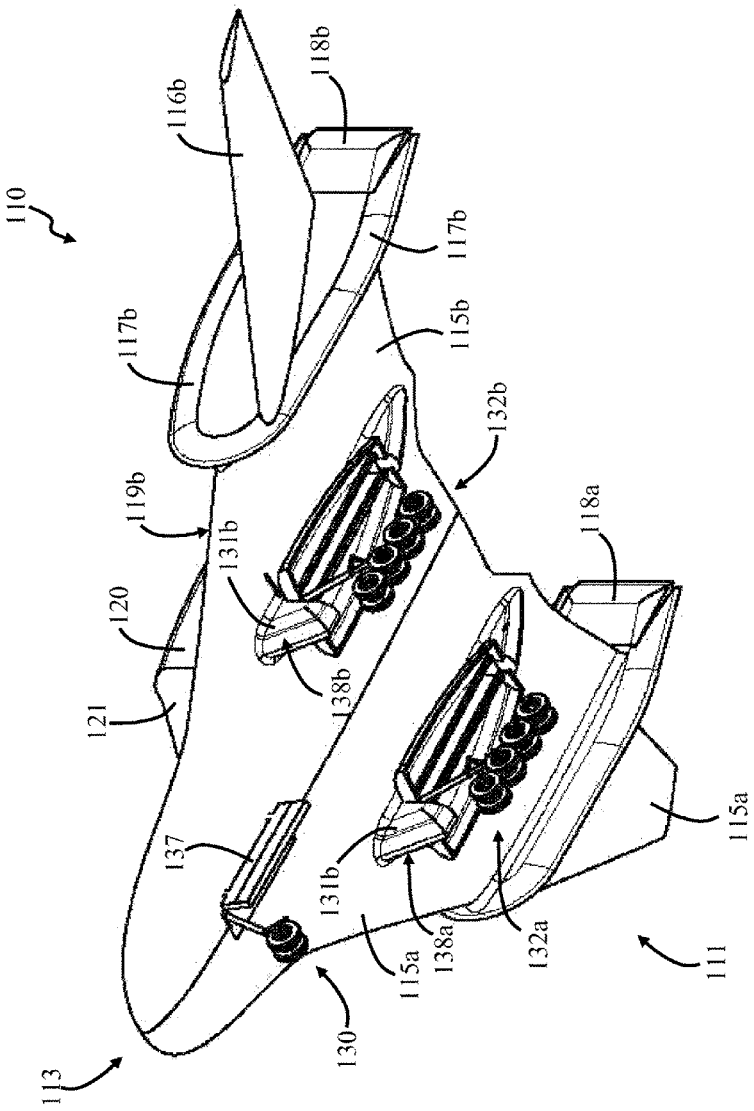

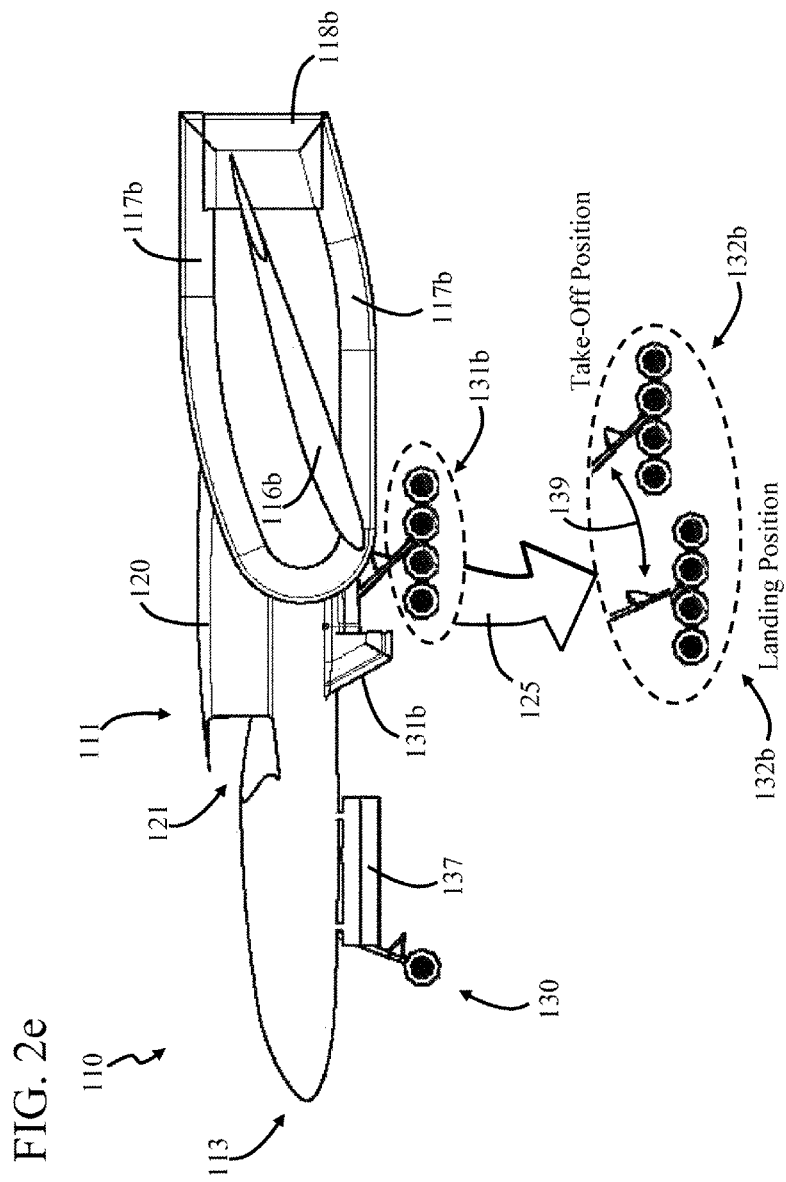

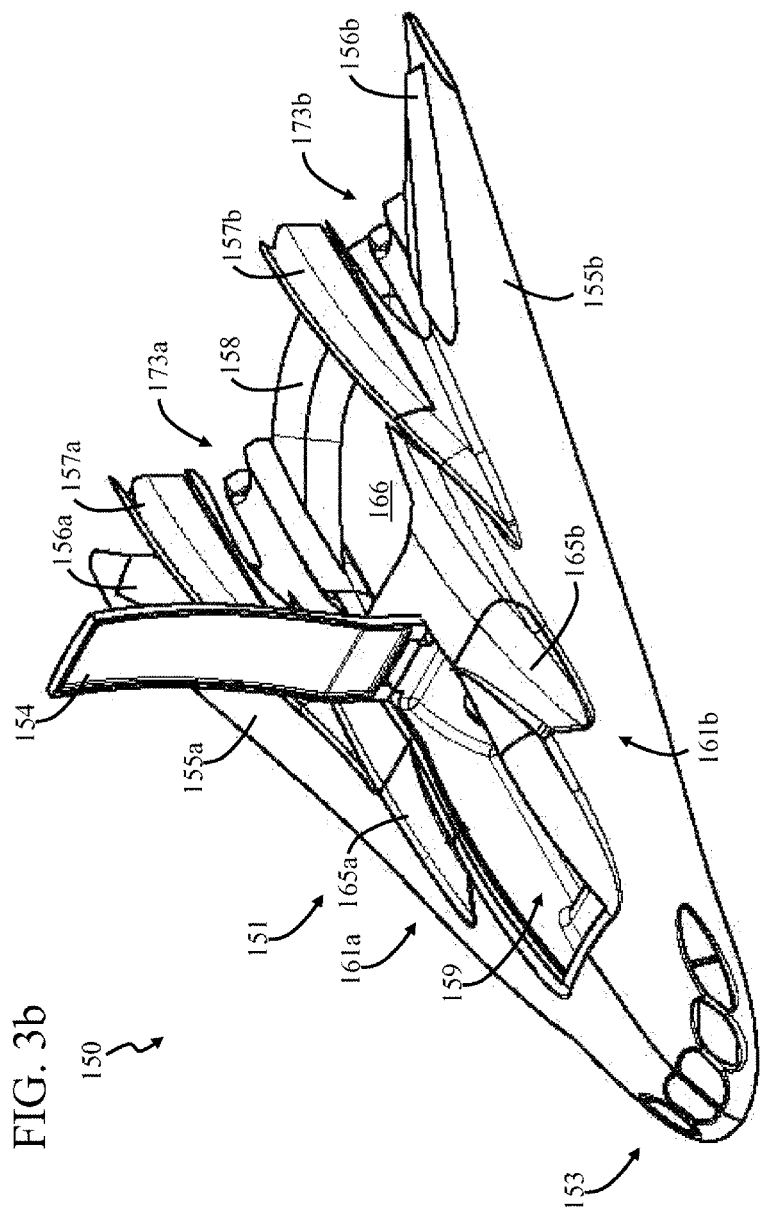

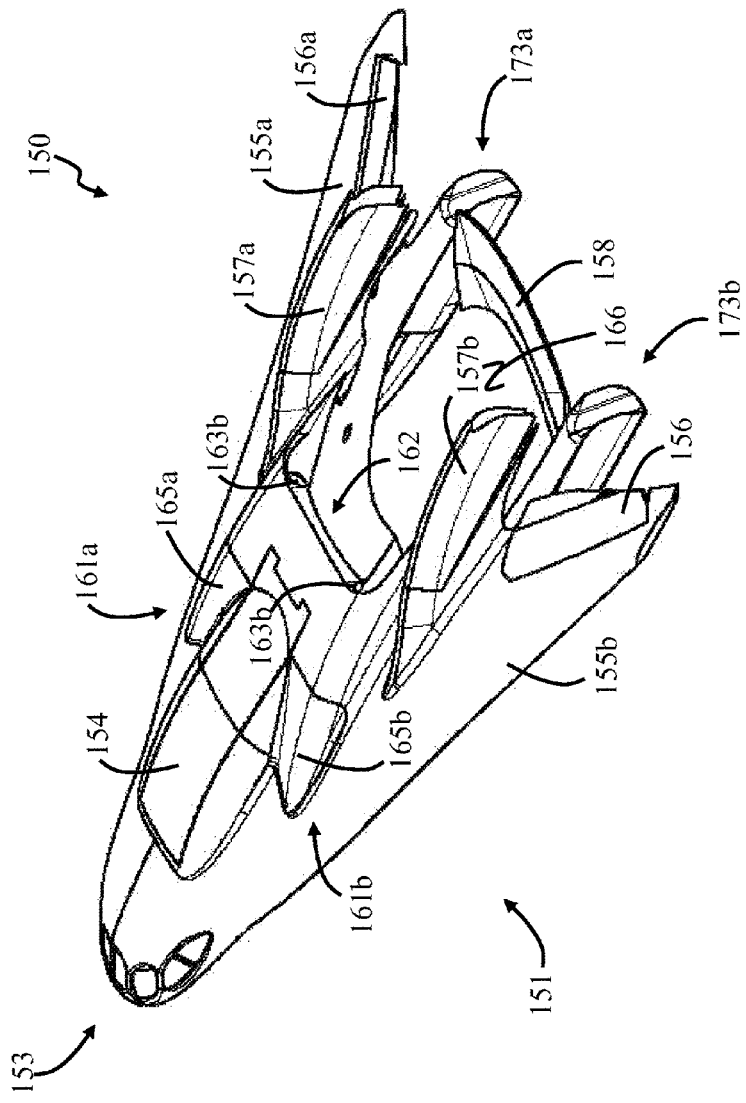

IN-LINE STAGED HORIZONTAL TAKEOFF AND LANDING SPACE PLANE

CROSS-REFERENCE TO RELATED APPLICATIONS

This patent application claims priority to U.S. Provisional Application No. 61/368,990, by the same inventor, filed on Jul. 29, 2010, the contents of which are incorporated by reference as though fully set forth herein.

BACKGROUND OF THE INVENTION

1. Field of the Invention

This invention relates generally to flight vehicles and, more particularly, to vehicles which are joined and separable during flight.

2. Description of the Related Art

There are many different vehicles available for spaceflight. Some vehicles are unmanned, and do not involve carrying occupants. Examples of unmanned vehicles for spaceflight include space probes and satellites. Other vehicles are manned, and do include carrying an occupant, such as a human. Examples of manned vehicles are disclosed in U.S. Pat. Nos. D302,148, 3,369,771, 3,700,193, 3,702,688, 3,866,863, 4,265,416, 4,452,412, 4,802,639, 4,901,949 5,564,653 and 6,612,522, the contents of which are incorporated by reference as though fully set forth herein. U.S. Pat. No. 6,612,522 provides an extensive discussion about the background and history of spaceflight.

Vehicles for manned spaceflight typically include a launch vehicle, having a launch propulsion system, and a crew vehicle or orbiter carried by the launch vehicle. The launch propulsion system propels the crew vehicle into orbit. The crew vehicle includes a crew cabin and return propulsion system. The crew cabin houses a human occupant, and the return propulsion system returns the crew vehicle from orbit. The crew vehicle can be of many different types, such as a space capsule and space shuttle.

In some manned vehicles, the launch propulsion system launches the crew vehicle vertically from a launch pad. Examples of such vertical launch propulsion systems include a rocket. In some instances, the rocket is retrieved after launch so that it can be reused to reduce costs and waste. An example of a vertical launch system is disclosed in U.S. Pat. No. 3,866,863. It should be noted that the rocket provides propulsion, but it typically does not provide much lift because it does not include wings. The rocket may include fins for stabilization. However, any lift provided by the fins is negligible.

The crew vehicle of a vertical launch system generally provides more drag than lift during launch. However, some crew vehicles may provide lift after separation from the launch propulsion system. For example, the space shuttle includes wings that provide lift, which only allows it to controllably glide and land but do not add lift on ascent.

In other manned vehicles, the launch vehicle is an airplane, which allows the crew vehicle to be horizontally launched from a runway. The airplane carries the crew vehicle to a predetermined altitude at which separation occurs, and the crew vehicle propels itself into orbit. The airplane is landed after launch so that it can be reused to reduce costs and waste. Further, the crew vehicle includes wings that provide lift, which allows it to controllably glide and land using its return propulsion system. Examples of horizontal launch systems are disclosed in U.S. Pat. Nos. 4,265,416, 4,802,639 and 4,901,949.

Although the disclosed systems for manned spaceflight may be suitable for their intended purposes, it is desirable to provide a system which reduces the costs of space flight.

BRIEF SUMMARY OF THE INVENTION

The present invention is directed to a flight vehicle which has sub-vehicles that provide lift on ascent and are separable during flight. The novel features of the invention are set forth with particularity in the appended claims. The invention will be best understood from the following description when read in conjunction with the accompanying drawings.

BRIEF DESCRIPTION OF THE DRAWINGS

FIG. 1a is a perspective view of a flight vehicle in an uncoupled condition, wherein the flight vehicle includes a crew vehicle and launch vehicle.

FIG. 1f is a rear view of the flight vehicle of FIG. 1a in the coupled condition.

FIG. 1g is a bottom perspective view of the flight vehicle of FIG. 1a in the coupled condition.

FIG. 1j is a side view of the flight vehicle of FIG. 1a in the coupled condition, wherein portions of a frame is shown in phantom.

FIG. 1k is a rear view of another embodiment of the flight vehicle of FIG. 1a showing more details of a launch vehicle propulsion system.

FIGS. 1l and 1m are top and bottom perspective views, respectively, of the frame of the flight vehicle of FIG. 1a.

FIGS. 1n and 1o are perspective exploded views of canopy assemblies of the flight vehicle of FIG. 1a.

FIG. 2a is a rear perspective view of the launch vehicle of FIG. 1a.

FIG. 2b is a bottom perspective view of the launch vehicle of FIG. 2a.

FIG. 2c is a bottom view of the launch vehicle of FIG. 2a.

FIG. 2d is a rear view of the launch vehicle of FIG. 2a.

FIG. 2e is a side view of the launch vehicle of FIG. 2a with main landing gear in the take-off position and landing position.

FIG. 3a is a front perspective view of the crew vehicle of FIG. 1a.

FIG. 3b is a front perspective view of the crew vehicle of FIG. 3a with a payload door in an open position.

FIG. 3c is a rear perspective view of the crew vehicle of FIG. 3a.

FIG. 3d is a top plan view of the crew vehicle of FIG. 3a.

FIG. 3e is a side view of the crew vehicle of FIG. 3a.

FIG. 4b is a perspective view of the flight vehicle of FIG. 4a.

FIG. 4c is a cut-away side view of the flight vehicle of FIG. 4a taken along a cut-line 4c-4c of FIG. 4a.

FIG. 4d is a cut-away side view of the flight vehicle of FIG. 4a taken along a cut-line 4d-4d of FIG. 4a.

DETAILED DESCRIPTION OF THE INVENTION

Figure 1B:
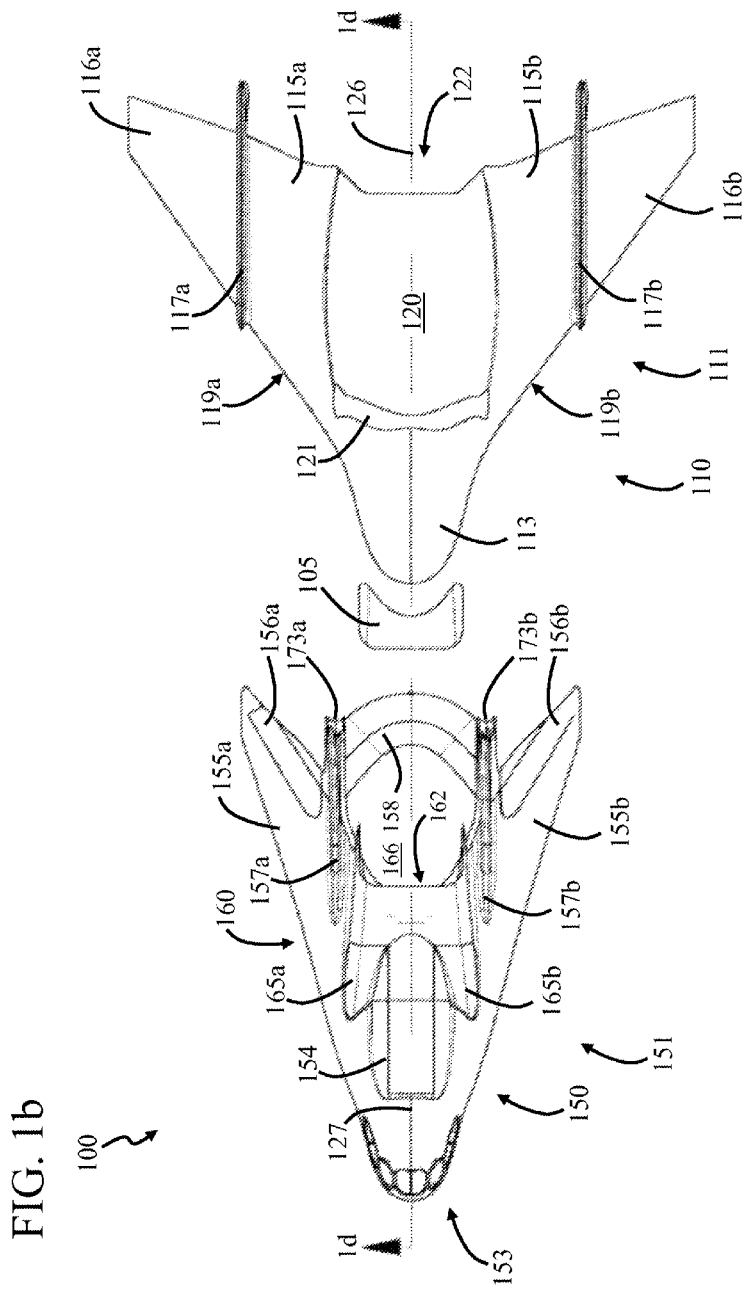
FIG. 1b is a top plan view of the flight vehicle of FIG. 1a in the uncoupled condition.
Figure 1C:
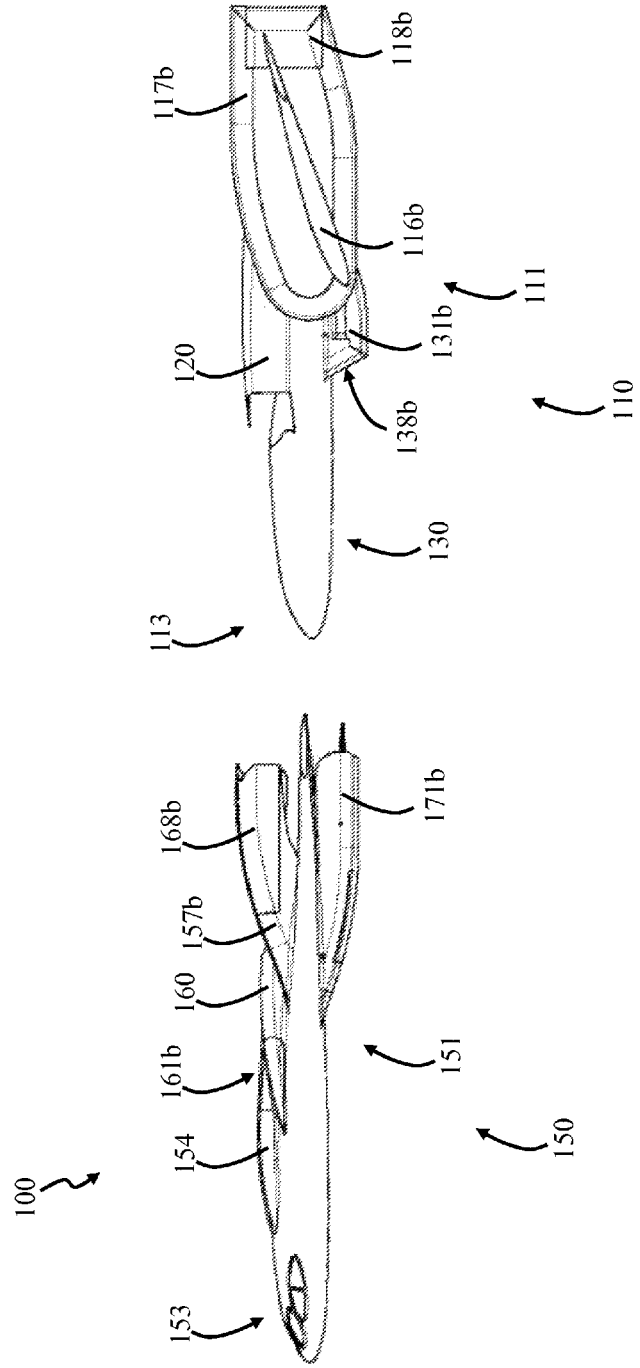
FIG. 1c is a side view of the flight vehicle of FIG. 1a in the uncoupled condition.
Figure 1D:
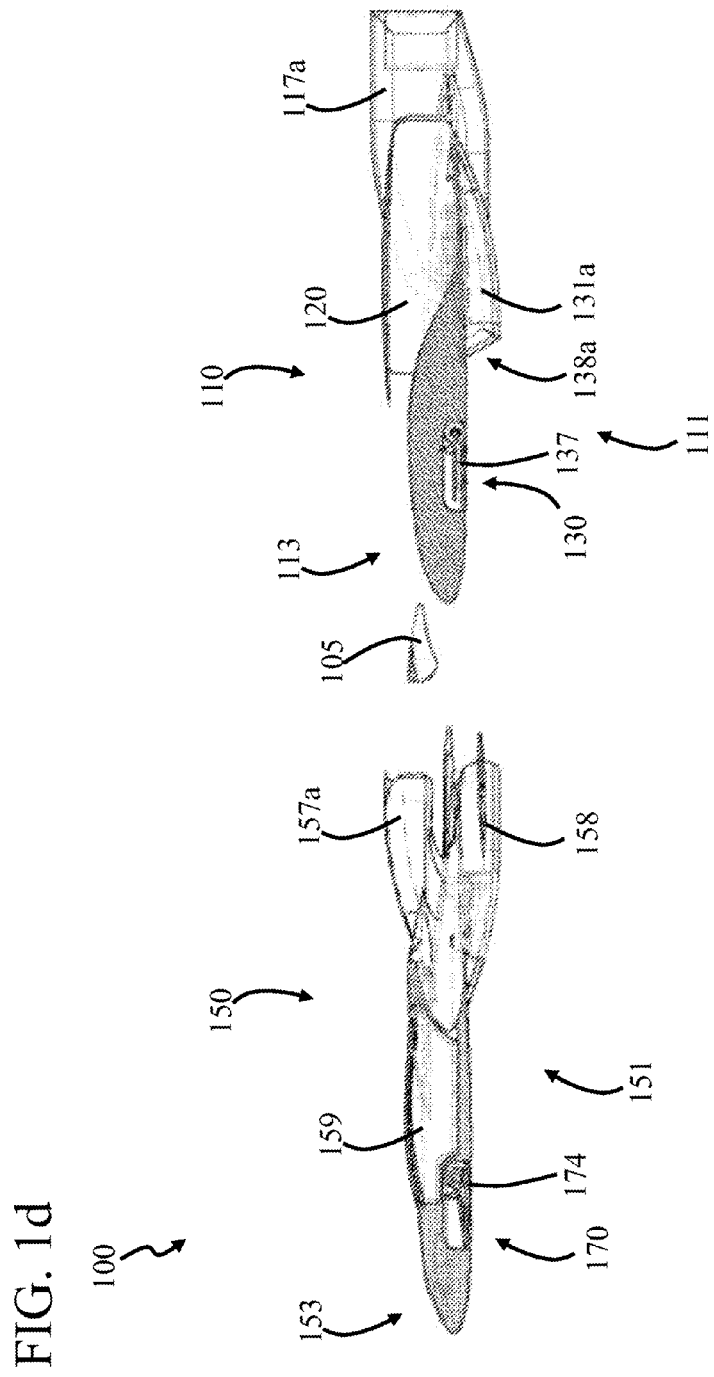
FIG. 1d is a cut-away side view of the flight vehicle of FIG. 1a in the uncoupled condition taken along a cut-line 1d-1d of FIG. 1b.

The present invention involves a flight vehicle which includes a launch vehicle and crew vehicle. It should be noted that more information regarding the flight vehicle and its operation is provided in the above-references U.S. Provisional Application No. 61/368,990.

The launch vehicle and crew vehicle are coupled together before flight and separable during flight. The flight vehicle is launched horizontally from a runway. After separation, the launch vehicle and crew vehicle are flyable in a controllable manner, and are capable of landing horizontally on a runway. In some embodiments, the launch vehicle and crew vehicle are both manned. However, in other embodiments, the launch vehicle is manned, and the crew vehicle is unmanned so that it operates as a payload vehicle. In other embodiments, the launch vehicle is unmanned and the crew vehicle is manned. In some embodiments, the launch and crew vehicles are both unmanned. The unmanned vehicle may be remotely controlled or autonomous.

The launch vehicle includes a launch propulsion system for carrying the crew vehicle to a predetermined altitude. The launch vehicle includes wings, which allows it to land at a runway in a controllable manner after the crew vehicle has been separated. It should be noted, however, that the launch vehicle is capable of landing in a controlled manner with the crew vehicle still attached. The crew vehicle includes a crew propulsion system and wings, which allows it to land at a runway in a controllable manner after it has been separated from the launch vehicle.

Hence, the launch and crew vehicles are both recoverable so they can be used again. Further, during flight and before separation, the wings of the launch vehicle and crew vehicle both provide lift so that the flight vehicle uses less fuel. In this way, the flight vehicle reduces the costs of flight. It should be noted that in the following figures, like reference characters indicate corresponding elements throughout the several views.

The flight vehicle includes two stages which are of a blended flying wing configuration. The crew vehicle is shaped to fit in front of the launch vehicle by shaping the rear surfaces of the crew vehicle to match the leading edges of the launch vehicle so that they fly together in-line. Their rounded forms are conducive to reentry heat dissipation and adequate for subsonic operation in the lower atmosphere. Ascending out of the atmosphere coupled in-line allows less drag in transition through supersonic flight. Their thick section offers light truss construction and large internal storage volume. Both aircraft provide lift during flight, reducing the size and mass of both vehicles.

The crew and launch vehicles are flown from a runway assembled in nose-to-tail configuration under conventional jet power. In one situation, the crew and launch vehicles ascend to 40,000 feet in a subsonic climb, and adjust the angle of ascent as needed. The launch vehicle ceases jet engine operations as hybrid rockets boost it further to near space. At main engine cut off, the second stage is boosted by gas catapult to a safe separation while the crew vehicle liquid fuel rockets fire for orbital insertion. The launch vehicle returns to the spaceport runway as an unmanned vehicle. The mass of the booster, jet engines and the booster rockets are all removed from the smaller orbiter. The crew vehicle can escape from the launch vehicle in emergency situations, such as when the launch vehicle malfunctions. It should be noted that the flight vehicle can be vertically launched, or rail launched if desired.

The crew vehicle can ascend to a desired orbit or sub-orbit. Reentry of the crew vehicle is slowed by an elevator flap which produces a nose-high attitude for drag and heat dissipation. After reaching the lower atmosphere, the crew vehicle jet engine inlets are opened to provide a powered landing. In the event of bad weather or another need, the crew vehicle can fly cross-range to an alternate spaceport. A second takeoff is possible, possibly assisted by the rocket engines for a short takeoff.

The vehicle is useful in many different configurations. For example, the flight vehicle can be used as a sailplane launcher or a weapons carrier. The vehicle can be used as an orbital or sub-orbital cruise missile. The crew vehicle can be used as a sub-orbital troop carrier. The crew vehicle can be used as an unmanned tanker which carries material for suppressing a fire, such as a forest fire. Commercial aviation may launch small airliners that use less fuel after the initial boosted takeoff. Future propulsion may be used on the crew vehicle with the booster providing the supersonic speed needed to initiate scramjet operation. Earth airline and cargo transportation can save fuel and add speed with suborbital flight.

The vehicle can be used as an unmanned surveillance platform for monitoring. The monitoring can be of many different types, such as visual monitoring and electronic monitoring. Visual monitoring includes gathering pictures and video and electronic monitoring includes intercepting electronic signals. The crew vehicle can also be uncoupled from the launch vehicle and used as a missile against ground or air targets. The launcher represents the cheapest way to deliver a single missile with a small radar signature and low cost. The weapon stage contributes to lift for a smaller carrier and a high performance maneuverable shape for target pursuit. Ten small aircraft present a greater threat to air defense than one aircraft with ten weapons.

FIGS. 1a-1k are views of an embodiment of a flight vehicle 100, which includes a launch vehicle 110 and crew vehicle 150. FIGS. 1a, 1b, 1c and 1d are views of flight vehicle 100 in an uncoupled condition, and FIGS. 1e, 1f, 1g, 1h, 1i, 1j and 1k are views of flight vehicle 100 in a coupled condition. FIGS. 1l and 1m are perspective views of an exemplary fuselage of flight vehicle 100, and FIGS. 1n and 1o are perspective views of capsule assemblies of flight vehicle 100. FIGS. 2a-2e are views of launch vehicle 110, and FIGS. 3a-3e are view of crew vehicle 150.

In this embodiment, launch vehicle 110 and crew vehicle 150 are repeatably moveable between the coupled and uncoupled conditions, as will be discussed in more detail below. In the coupled condition, launch vehicle 110 engages a rearward portion of crew vehicle 150 and, in the uncoupled condition, launch vehicle 110 disengages the rearward portion of crew vehicle 150. In some embodiments, launch vehicle 110 and crew vehicle 150 slide relative to each other in response to moving between the coupled and uncoupled conditions. Flight vehicle 100 may include a fairing 105, which is coupled between launch vehicle 110 and crew vehicle 150, as will be discussed in more detail below.

In this embodiment, launch vehicle 110 includes a launch vehicle body 111 having a launch vehicle frame 112. Launch vehicle frame 112 will be discussed in more detail below with FIGS. 1l and 1m. It should be noted that, for reference purposes, a centerline 126 extends longitudinally through launch vehicle body 111. It should be noted that, in this embodiment, launch vehicle 110 is a flying wing configuration so that it does not include a separate fuselage. Examples of aircraft having a flying wing configuration include the B-2 Spirit.

Launch vehicle body 111 includes a launch vehicle nose 113, and a launch propulsion system 120 which extends rearward from launch vehicle nose 113. In this embodiment, launch propulsion system 120 includes a turbine launch propulsion system intake 121 and launch propulsion system exhaust 122, wherein turbine launch propulsion system intake 121 faces launch vehicle nose 113 and launch propulsion system exhaust 122 faces away from launch vehicle nose 113. Turbine launch propulsion system intake 121 and launch propulsion system exhaust 122 extend through opposed sides of centerline 126. It should be noted that launch propulsion system intake 121 and launch propulsion system exhaust 122 are in fluid communication with each other so that atmospheric air flows through launch propulsion system 120 by flowing into launch propulsion system intake 121 and out of launch propulsion system exhaust 122.

As shown in FIG. 1k, launch propulsion system 120 includes a turbine or ram jet engine 163a and rocket engine 164a, wherein the atmosphere flows through jet engine 163a. In this particular embodiment, launch propulsion system 120 includes four jet engines and three rocket engines. However, in general, launch propulsion system 120 includes one or more jet engines. Further, launch propulsion system 120 includes one or more rocket engines. In this embodiment, launch vehicle body 111 includes launch vehicle wings 115a and 115b which extend rearward and away from launch vehicle nose 113 and outwardly from opposed sides of launch propulsion system 120. The planform of launch vehicle wings 115a and 115b can be of many different types. In this embodiment, the planform of launch vehicle wings 115a and 115b includes swept leading edges 119a and 119b, respectively, and swept trailing edges.

In this embodiment, launch vehicle body 111 includes launch vehicle stabilizers 117a and 117b positioned at outer distal edges of launch vehicle wings 115a and 115b, respectively. Launch vehicle stabilizers 117a and 117b provide stability to launch vehicle 110 in a direction perpendicular to launch vehicle wings 115a and 115b.

In this embodiment, launch vehicle stabilizers 117a and 117b include launch vehicle rudders 118a and 118b, respectively, positioned towards a rearward end of launch vehicle body 111. Launch vehicle rudders 118a and 118b are adjustable to adjust the yaw of launch vehicle 110.

In this embodiment, launch vehicle body 111 includes launch vehicle elevons 116a and 116b, which extend outwardly from launch vehicle stabilizers 117a and 117b, respectively. Launch vehicle elevons 116a and 116b are adjustable to adjust the pitch and roll of launch vehicle 110. It should be noted that the pitch and roll of launch vehicle 110 can be adjusted in many other ways, such as by using flaps and ailerons. However, elevons are included in this embodiment for illustrative purposes.

In this embodiment, launch vehicle 110 includes launch vehicle nose gear 130 which is positioned proximate to launch vehicle nose 113. Launch vehicle nose gear 130 is repeatably moveable between stowed and deployed positions. Launch vehicle nose gear 130 is shown in the stowed position in FIGS. 1c and 1d, and launch vehicle nose gear 130 is shown in the deployed position in FIGS. 2b, 2d and 2e.

In this embodiment, launch vehicle 110 includes a launch vehicle nose gear door 137, which is repeatably moveable between opened and closed positions. Launch vehicle nose gear door 137 is shown in the closed position in FIGS. 1d, 1g and 1h, and launch vehicle nose gear door 137 is shown in the open position in FIGS. 2b, 2d and 2e. Launch vehicle nose gear door 137 is in the open and closed positions when launch vehicle nose gear 130 is in the deployed and stowed positions, respectively.

In this embodiment, launch vehicle body 111 includes launch vehicle main gear housings 131a and 131b, which are positioned at opposed sides of centerline 126. Launch vehicle main gear housings 131a and 131b extend downwardly from launch vehicle wings 115a and 115b, respectively. Launch vehicle main gear housings 131a and 131b extend longitudinally along launch vehicle body 111. Launch vehicle main gear housings 131a and 131b include launch vehicle main gear housing fronts 138a and 138b, respectively, which face launch vehicle nose 113.

In this embodiment, launch vehicle 110 includes launch vehicle main gear 132a and 132b which are positioned proximate to launch vehicle main gear housings 131a and 131b, respectively. Launch vehicle main gear 132a and 132b are repeatably moveable between stowed and deployed positions. Launch vehicle main gear 132a and 132b are shown in the stowed position in FIGS. 1c and 1i, and launch vehicle main gear 132a and 132b are shown in the deployed position in FIGS. 1d, 1f, 1g, 2b, 2d and 2e. Launch vehicle main gear 132a and 132b retract into launch vehicle main gear housings 131a and 131b, respectively, in the stowed position. Launch vehicle main gear 132a and 132b extend out of launch vehicle main gear housings 131a and 131b, respectively, in the deployed position.

In this embodiment, crew vehicle 150 includes a crew vehicle body 151 having a crew vehicle frame 152. Crew vehicle frame 152 will be discussed in more detail below with FIGS. 1l and 1m. It should be noted that, for reference purposes, a centerline 127 extends longitudinally through crew vehicle body 151. It should also be noted that, in this embodiment, crew vehicle 150 is a flying wing configuration so that it may not include a fuselage. Examples of aircraft having a flying wing configuration include the B-2 Spirit. Variations may include a blended wing body which blends bulges that serve as a partial fuselage to the flying wing form. These vehicles may have elements of partial fuselage or engine nacelles blended to the flying wing.

Crew vehicle body 151 includes a crew vehicle nose 153, and a crew propulsion system 160 which extends rearward from crew vehicle nose 153. In this embodiment, crew propulsion system 160 includes crew propulsion system turbine intakes 161a and 161b and crew propulsion system exhaust 162, wherein crew propulsion system intakes 161a and 161b face crew vehicle nose 153 and crew propulsion system exhaust 162 faces away from crew vehicle nose 153. Crew propulsion system turbine intakes 161a and 161b and are positioned on opposed sides of centerline 127, and crew propulsion system exhaust 162 extends through opposed sides of centerline 127. It should be noted that crew propulsion system intakes 161a and 161b and crew propulsion system exhaust 162 are in fluid communication with each other so that atmospheric air flows through crew propulsion system 160 by flowing into crew propulsion system intakes 161a and 161b and out of crew propulsion system exhaust 162. The fluid includes the atmosphere.

In this embodiment, crew propulsion system 160 includes jet engine 163b and rocket engine 164b, wherein jet engine 163b is in fluid communication with crew propulsion system intakes 161a and/or 161b so that the atmosphere flows through jet engine 163b. In general, crew propulsion system 160 includes one or more jet engines. Further, crew propulsion system 160 includes one or more rocket engines.

In this embodiment, crew vehicle body 151 includes intake shrouds 165a and 165b positioned proximate to crew propulsion system intakes 161a and 161b, respectively. Intake shrouds 165a and 165b are repeatably moveable between open and closed positions. In the open position, atmospheric air is allowed to flow through crew propulsion system intakes 161a and 161b. In this closed position, atmospheric air is restricted from flowing through crew propulsion system intakes 161a and 161b. Intake shrouds 165a and 165b are shown in the closed position in FIGS. 1a, 1c, 1d, 3b, 3c and 3e. Intake shrouds 165a and 165b are shown in the open position in FIG. 3a.

In this embodiment, crew vehicle 150 includes a capsule assembly positioned proximate to crew vehicle nose 153. The capsule assembly is capable of holding a person. An embodiment of a capsule assembly is discussed with FIGS. 1n and 1o. Further, crew vehicle 150 includes a payload bay 159 which extends between crew vehicle nose 153 and crew propulsion system 160. Crew vehicle 150 includes a payload bay door 154 which is repeatably moveable between open and closed positions. Payload bay door 154 covers payload bay 159 in the closed position, and payload bay door 154 uncovers payload bay 159 in the open position. Payload bay door 154 is shown in the closed position in FIGS. 1a, 1c, 1d, 3a and 3c. Payload bay door 154 is shown in the open position in FIG. 3b. Payload bay 159 holds a payload, if desired. The payload can be of many different types, such as a satellite, space probe and equipment. However, it should be noted that the payload can be another crew capsule assembly.

In this embodiment, crew vehicle body 151 includes crew vehicle wings 155a and 155b which extend rearward and away from crew vehicle nose 153 and outwardly from opposed sides of crew propulsion system 160. The planform of crew vehicle wings 155a and 155b can be of many different types. In this embodiment, the planform of crew vehicle wings 155a and 155b includes swept leading edges 159a and 159b, respectively, and swept trailing edges.

In this embodiment, crew vehicle body 151 includes crew vehicle stabilizers 157a and 157b positioned proximate to inner edges of crew vehicle wings 155a and 155b, respectively. Crew vehicle stabilizers 157a and 157b positioned proximate to opposed sides of crew propulsion system 160. Crew vehicle stabilizers 157a and 157b provide stability to crew vehicle 150 in a direction perpendicular to crew vehicle wings 155a and 155b.

In this embodiment, crew vehicle stabilizers 157a and 157b include crew vehicle rudders 168a and 168b, respectively, positioned towards a rearward end of crew vehicle body 151. Crew vehicle rudders 168a and 168b are adjustable to adjust the yaw of crew vehicle 150.

In this embodiment, crew vehicle body 151 includes crew vehicle ailerons 156a and 156b, which extend along corresponding trailing edges of crew vehicle wings 155a and 155b, respectively. Crew vehicle ailerons 156a and 156b are adjustable to adjust the pitch of crew vehicle 110. It should be noted that the pitch and roll of crew vehicle 150 can be adjusted in many other ways, such as by using flaps and elevons. However, ailerons are included in this embodiment for illustrative purposes.

In this embodiment, crew vehicle 150 includes crew vehicle nose gear 170 which is positioned proximate to crew vehicle nose 153. Crew vehicle nose gear 170 is repeatably moveable between stowed and deployed positions. Crew vehicle nose gear 170 is shown in the stowed position in FIGS. 1c, 1i, 1k, 3b and 3e, and crew vehicle nose gear 170 is shown in the deployed position in FIGS. 1d, 1e, 1f, 1g and 3a.

In this embodiment, crew vehicle 150 includes a crew vehicle nose gear door 174, which is repeatably moveable between opened and closed positions. Crew vehicle nose gear door 174 is shown in the closed position in FIG. 1k, and crew vehicle nose gear door 174 is shown in the open position in FIGS. 1d, 1e, 1g and 1h. Crew vehicle nose gear door 174 is in the open and closed positions when crew vehicle nose gear 170 is in the deployed and stowed positions, respectively.

In this embodiment, crew vehicle body 151 includes crew vehicle main gear housings 171a and 171b, which are positioned at opposed sides of centerline 127. Crew vehicle main gear housings 171a and 171b extend downwardly from crew vehicle wings 155a and 155b, respectively. Crew vehicle main gear housings 171a and 171b extend longitudinally along crew vehicle body 151. Crew vehicle main gear housings 171a and 171b include crew vehicle main gear housing brackets 173a and 173b, respectively, which are located aft of the crew vehicle nose 153.

In this embodiment, crew vehicle 150 includes crew vehicle main gear 172a and 172b which are positioned proximate to crew vehicle main gear housings 171a and 171b, respectively. Crew vehicle main gear 172a and 172b are repeatably moveable between stowed and deployed positions. Crew vehicle main gear 172a and 172b are shown in the stowed position in FIGS. 1c, 1k, 3b and 3e, and crew vehicle main gear 172a and 172b are shown in the deployed position in FIGS. 1d, 1f, 1g and 3a. Crew vehicle main gear 172a and 172b retract into crew vehicle main gear housings 171a and 171b, respectively, in the stowed position. Crew vehicle main gear 172a and 172b extend out of crew vehicle main gear housings 171a and 171b, respectively, in the deployed position.

In this embodiment, crew vehicle body 151 includes an elevator flap 158 which extends between crew vehicle main gear housings 171a and 171b. Flap 158 is coupled to crew vehicle main gear housings 171a and 171b. Elevator Flap 158 is adjustable to adjust the pitch of crew vehicle 150. Flap 158 extends through opposed sides of centerline 127. Flap 158 is positioned below crew propulsion system exhaust 162. As shown in FIGS. 1a, 1b, 3a, 3b, 3c and 3d, an opening 166 extends between flap 158, crew vehicle main gear housings 171a and 171b and crew propulsion system exhaust 162.

As mentioned above, FIGS. 1l and 1m are perspective views of launch vehicle frame 112 of flight vehicle 100. In this embodiment, flight vehicle 100 includes a capsule assembly 140a positioned proximate to vehicle nose 113. Capsule assembly 140a will be discussed in more detail below with FIG. 1n. In this embodiment, flight vehicle 100 includes a capsule assembly 140b positioned in payload bay 159 (FIG. 3b). Capsule assembly 140b will be discussed in more detail below with FIG. 1o.

In this embodiment, launch vehicle wings 115a and 115b include conceptual structures as represented by 180a and 180b, respectively. Launch vehicle stabilizers 117a and 117b include structures as represented by 181a and 181b, respectively. Further, launch vehicle elevons 116a and 116b include structures as represented by 182a and 182b. It should be noted that launch vehicle frame 112 includes structures 180a and 180b, structures 181a and 181b and structures 182a and 182b.

Launch vehicle frame 112 carries one or more fuel tanks. In this embodiment, launch vehicle 110 includes tanks 194a, 194b and 194c and 195a and 195b. Tanks 194a, 194b and 194c and 195a and 195b can include many different types of fuel, such as rocket fuel and jet fuel. Tanks 194a, 194b and 194c and 195a and 195b provide fuel to jet 163a and/or rocket 164a.

In this embodiment, crew vehicle 150 includes tanks 190a and 190b, 191a and 191b and 192a and 192b. Tanks 190a and 190b, 191a and 191b and 192a and 192b can include many different types of fuel, such as rocket fuel and jet fuel. Tanks 190a and 190b, 191a and 191b and 192a and 192b provide fuel to jet 163b and/or rocket 164b.

FIG. 1n is a perspective view of capsule assembly 140a of FIGS. 1l and 1m. In this embodiment, capsule assembly 140a includes capsule top and bottom tubs 141a, which contain the pressurized crew environment and carry a crew module 147a. Crew module 147a operates as a seat for a crew member. It should be noted that capsule module 147a is an emergency protective capsule that replaces pressurized space suits in case of depressurization emergencies.

In this embodiment, capsule assembly 140a includes a capsule cover 142a, which is repeatably moveable between engaged and disengaged positions with capsule tub 141a. It should be noted that, in normal operation, capsule tub 141a and capsule cover 142a are hermetically sealed together when in the engaged condition, and can provide protection in emergency depressurization.

In this embodiment, capsule cover 142a includes a capsule cover front opening 143a sized and shaped to receive a front canopy 145a. Further, capsule cover 142a includes a capsule cover side opening 144a sized and shaped to receive a side canopy 146a.

FIG. 1o is a perspective view of capsule assembly 140b of FIGS. 1l and 1m. In this embodiment, capsule assembly 140b includes a capsule tub 141b, which carries a crew module 147b. Crew module 147b operates as a seat for a crew member. It should be noted that capsule module 147b is an emergency protective capsule that replaces pressurized space suits in case of depressurization emergencies.

In this embodiment, capsule assembly 140b includes a capsule cover 142b, which is repeatably moveable between engaged and disengaged positions with capsule tub 141b. It should be noted that, in normal operation, capsule tub 141b and capsule cover 142b are hermetically sealed together when in the engaged condition, and can provide protection in emergency depressurization.

In this embodiment, capsule cover 142b includes a capsule cover front opening 143b sized and shaped to receive a front canopy 145b. Further, capsule cover 142b includes a capsule cover side opening 144b sized and shaped to receive a side canopy 146b. It should be noted that the control surface of flight vehicle 100, such as the flaps, ailerons and elevons, can be controlled from capsule assemblies 140a and/or 140b.

In operation, launch vehicle 110 and crew vehicle 150 are moved from the uncoupled condition to the coupled condition. Launch vehicle 110 and crew vehicle 150 can be moved from the uncoupled condition to the coupled condition in many different ways. In this embodiment, launch vehicle 110 and crew vehicle 150 are positioned proximate to each other on a support surface, such as a hanger and taxiway. Launch vehicle 110 is moved towards the rearward end of crew vehicle 150 so that launch vehicle nose 113 moves towards crew propulsion system exhaust 162. Launch vehicle 110 is moved towards the rearward end of crew vehicle 150 so that launch vehicle nose 113 moves towards crew propulsion system exhaust 162 and between crew vehicle stabilizers 157a and 157b. Launch vehicle 110 is moved towards the rearward end of crew vehicle 150 so that launch vehicle nose 113 moves towards crew propulsion system exhaust 162 and between crew vehicle stabilizers 157a and 157b and between flap 158 and crew propulsion system exhaust 162.

Launch vehicle 110 is moved towards the rearward end of crew vehicle 150 so that crew vehicle brackets 173a and 173b engage launch vehicle gear near housing fronts 138a and 138b, respectively. In this way, launch vehicle main gear housings 131a and 131b are aligned with crew vehicle main gear housings 171a and 171b, respectively.

Figure 1E:
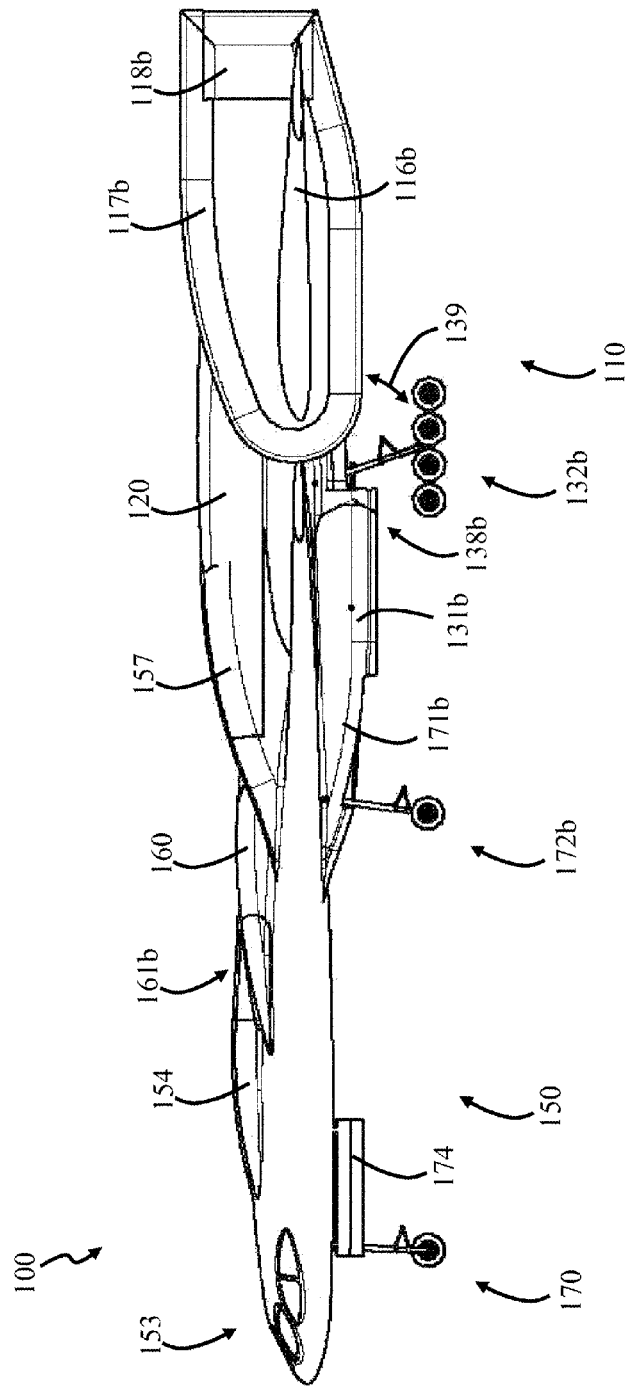
FIG. 1e is a side view of the flight vehicle of FIG. 1a in a coupled condition.
Figure 1H:
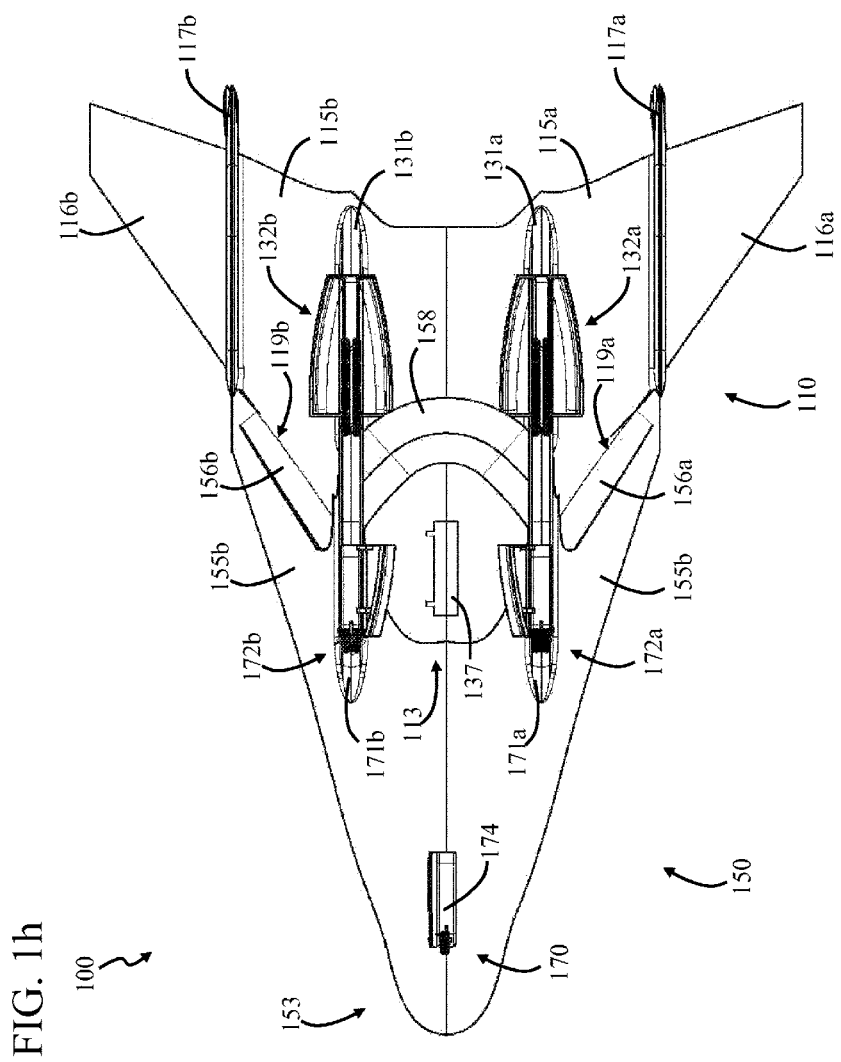
FIG. 1h is a bottom view of the flight vehicle of FIG. 1a in the coupled condition.
Figure 1I:
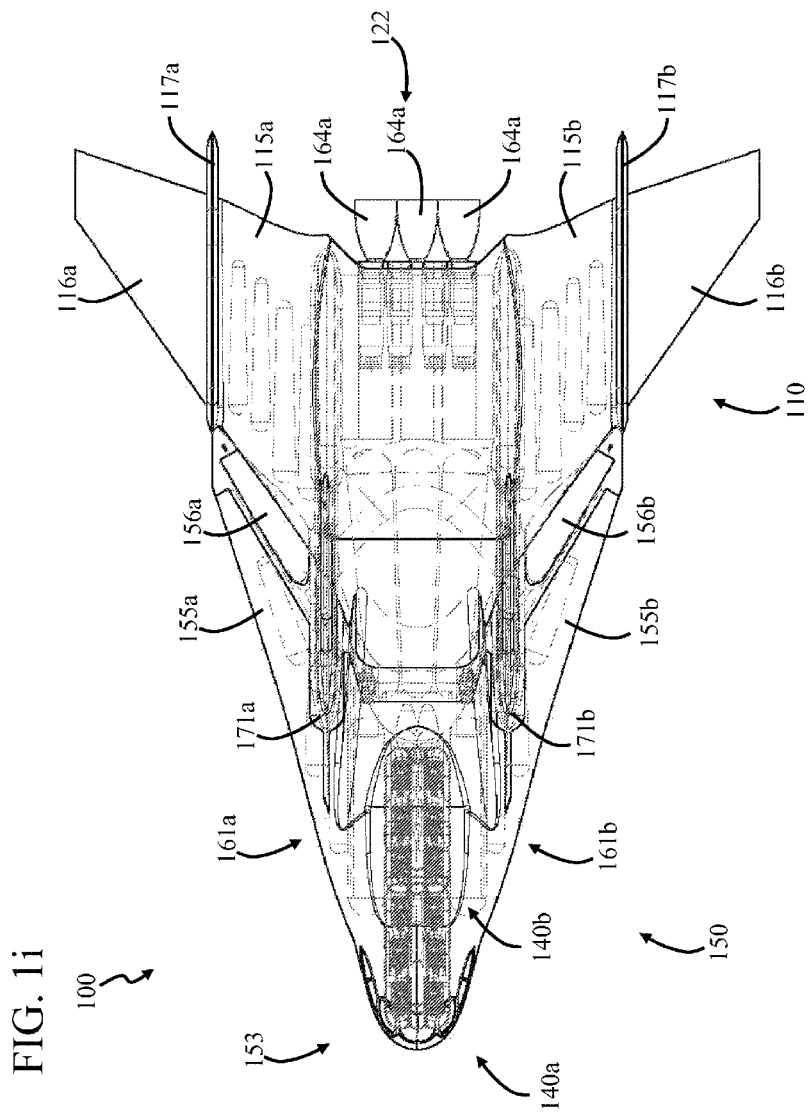
FIG. 1i is a top plan view of the flight vehicle of FIG. 1a in the coupled condition, wherein portions of a frame is shown in phantom.
Figure 11:
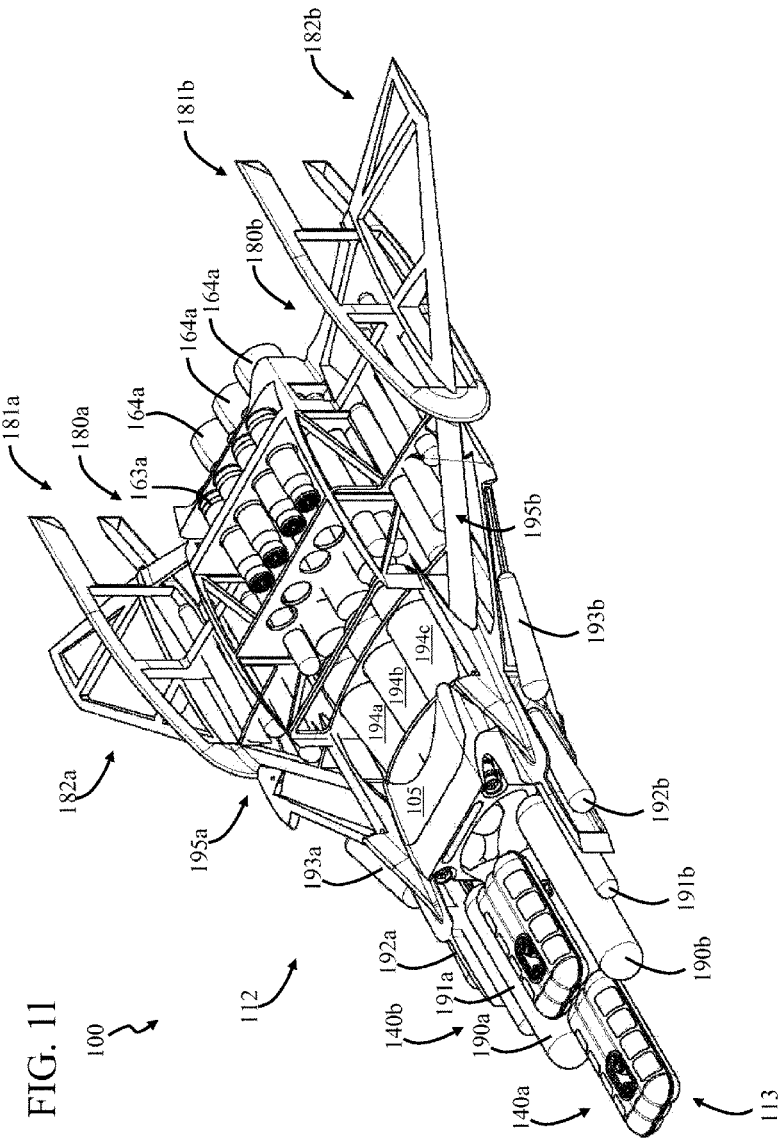
Figure 1M:
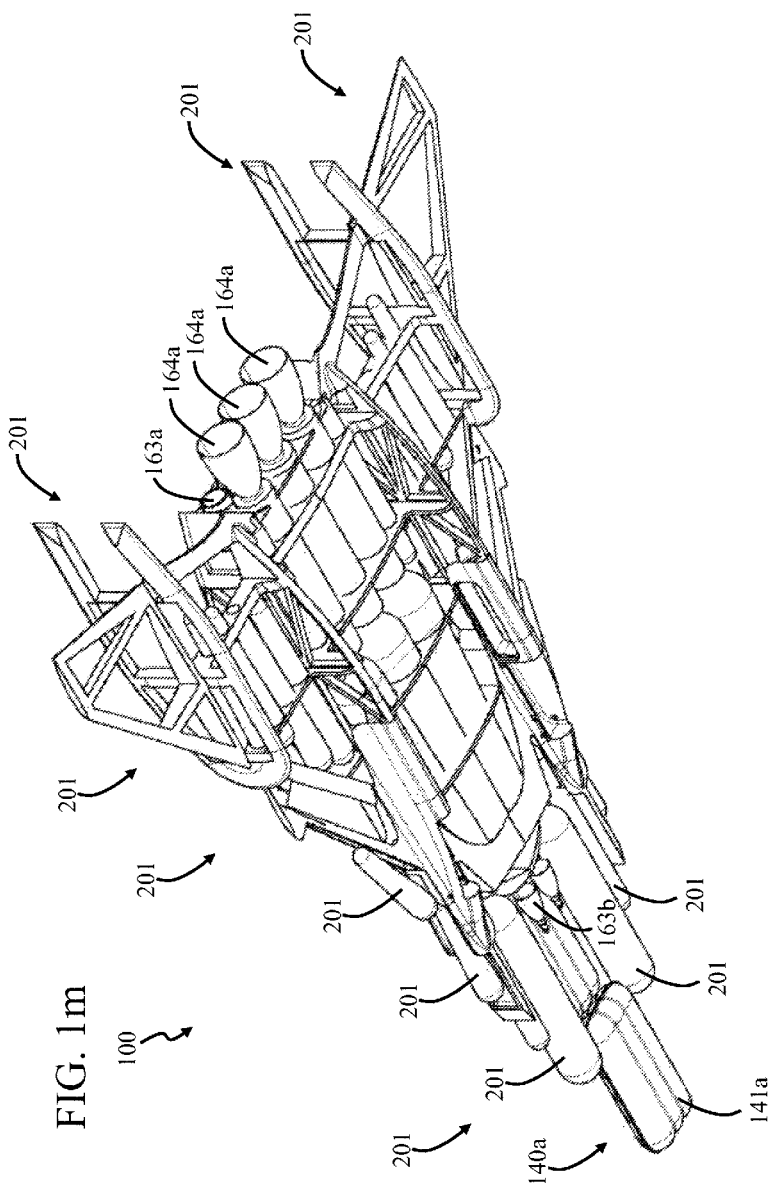
Figure 2C:
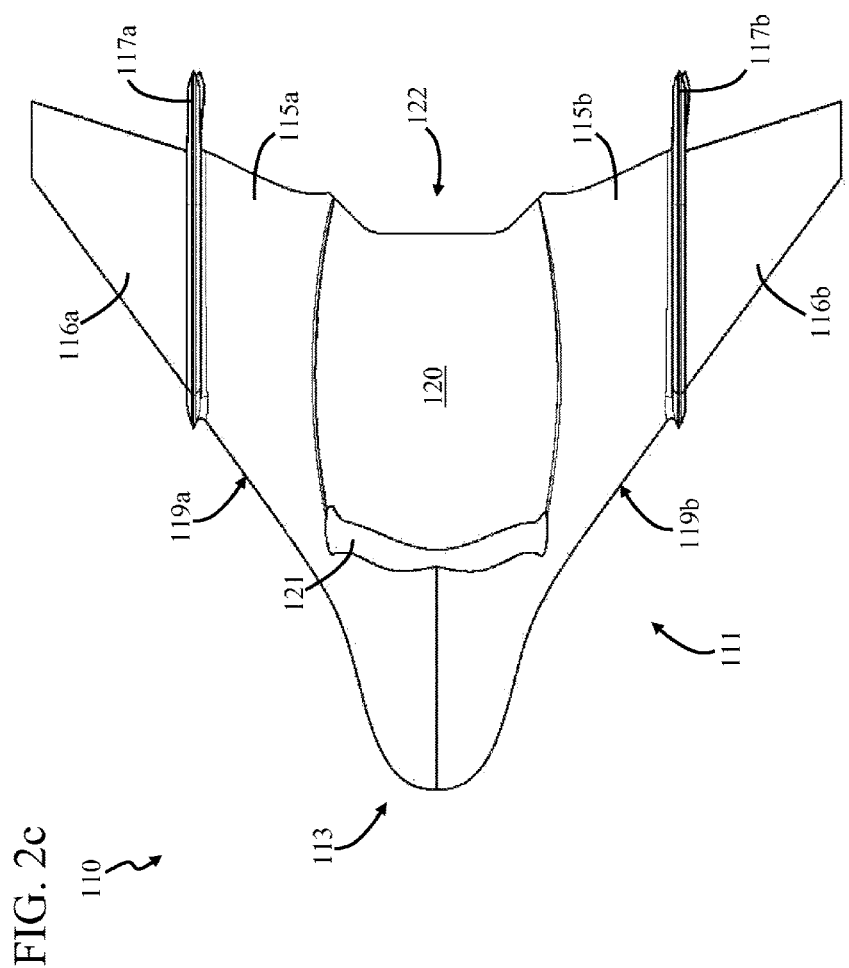
Figure 2D:
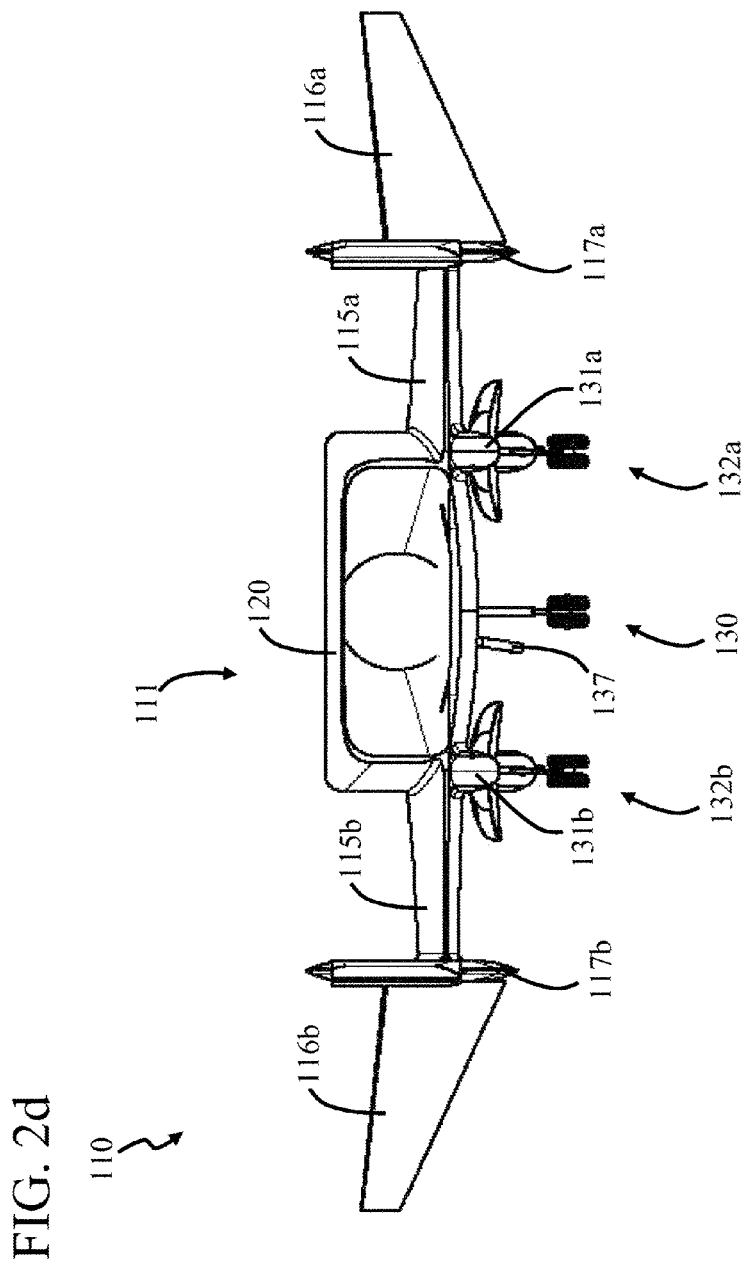
Figure 3A:
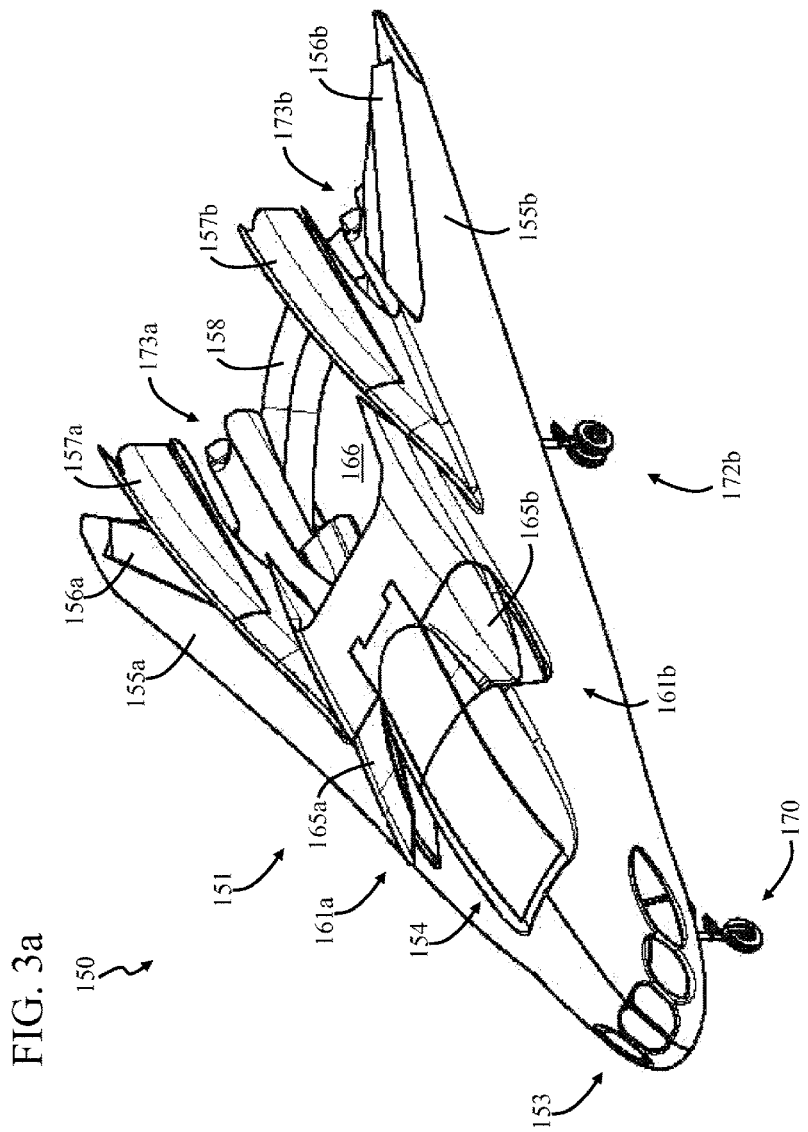
Figure 3D:
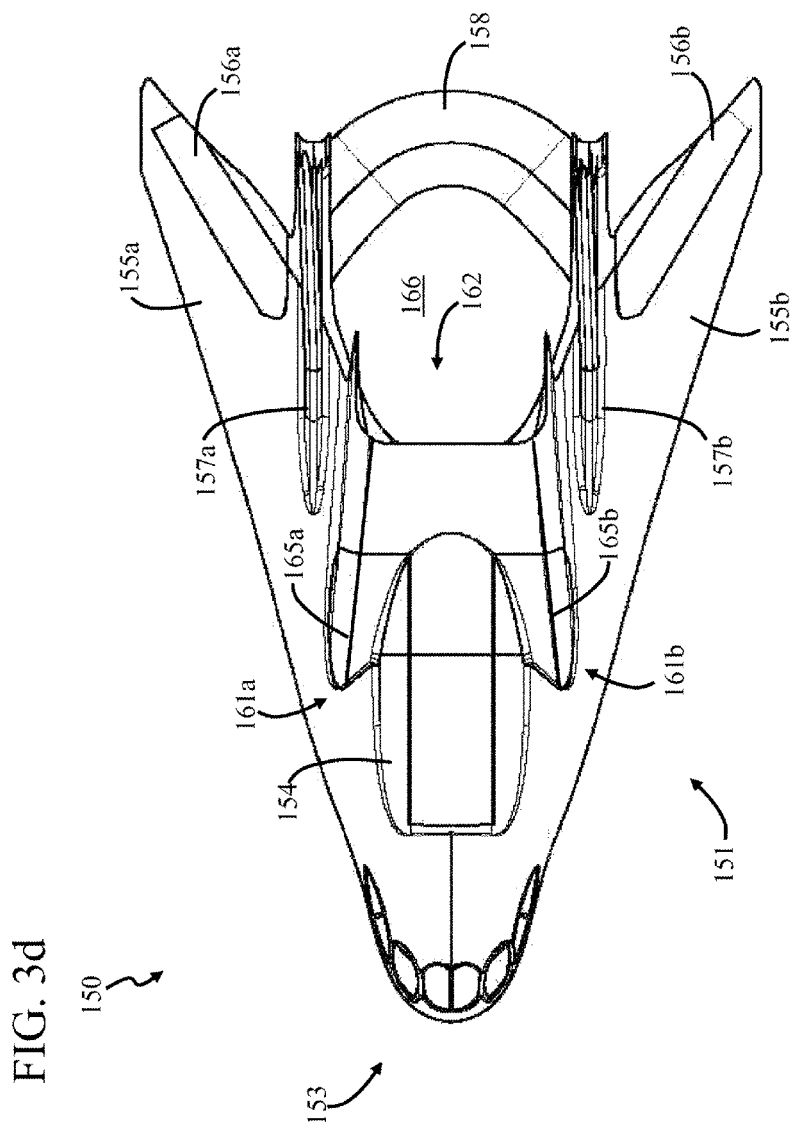
Figure 3E:
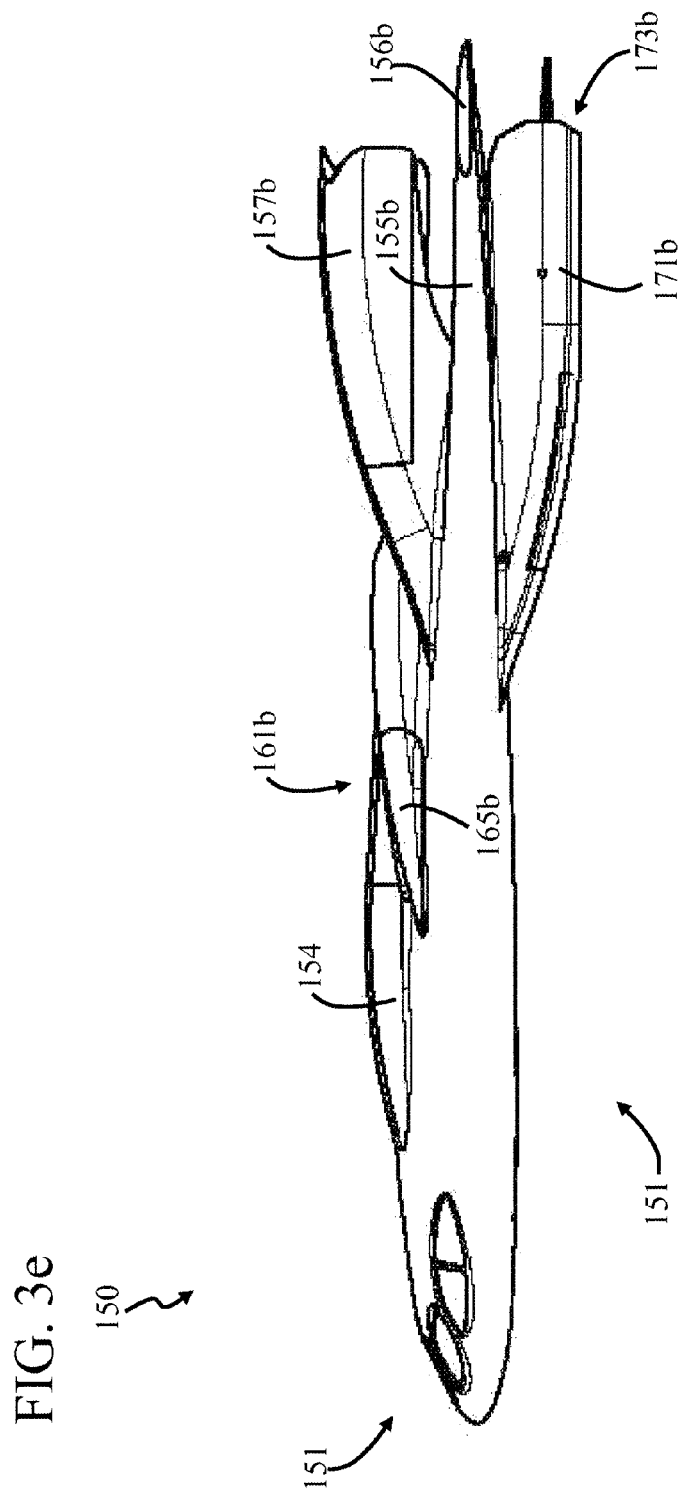

It should be noted that flap 158 is positioned proximate to a lower portion of launch vehicle nose 113, as shown in FIGS. 1g and 1h. As shown in FIGS. 1g and 1h, launch vehicle nose gear door 137 faces opening 166 (FIGS. 1a and 1b).

It should also be noted that crew vehicle ailerons 156a and 156b are positioned proximate to leading edges 119a and 119b, respectively, of corresponding launch vehicle wings 115a and 115b (FIG. 1h). The trailing edge of crew vehicle wings 155a and 155b is sized and shaped to conform to the shape of launch vehicle wings 115a and 115b, respectively. In this way, launch vehicle wing 115a and crew vehicle wing 155a operate as a single wing when launch vehicle 110 and crew vehicle 150 are in the coupled condition. Further, launch vehicle wing 115b and crew vehicle wing 155b operate as a single wing when launch vehicle 110 and crew vehicle 150 are in the coupled condition. In this way, both launch vehicle 110 and crew vehicle 150 contribute to lift when they are in the coupled condition. It should be noted that the controls of crew vehicle 150 are typically inoperable when flight vehicle 100 is in the coupled condition. Hence, coupled flight vehicle 100 is controlled by the operation of the flight controls of launch vehicle 110.

Fairing 105 is positioned proximate to crew propulsion system exhaust 162 and launch vehicle nose 113. Fairing 105 is sized and shaped to conform to the shapes of crew propulsion system exhaust 162 and launch vehicle nose 113 so that turbulence is reduced. It is desired to reduce the turbulence of the atmosphere which flows into launch vehicle propulsion system intake 121

In the coupled condition and during the take-off of flight vehicle 100, crew vehicle nose gear 170, crew vehicle main gear 172a and 172b and launch vehicle main gear 132a and 132b are in the deployed position (FIGS. 1e, 1g and 1h). Further, launch vehicle nose gear 130 is in the stowed condition.

As shown by an indication arrow 125 in FIG. 2e, launch vehicle main gear 132a and 132b are repeatably moveable between take-off and landing positions. In the take-off position, launch vehicle main gear 132a and 132b are moved forwardly and, in the landing position, launch vehicle main gear 132a and 132b are moved rearwardly. These two positions assure that the main gear are near but behind the center of gravity when the crew vehicle is either coupled or uncoupled. This allows the launcher to rotate easily on takeoff without being tail heavy on landing when the crew vehicle is departed.

In the coupled condition, jets 163a provide thrust to flight vehicle 100, and rockets 164a and 164b and jets 163b do not provide thrust. Hence, intake shrouds 165a and 165b are in the closed position so that the atmosphere does not flow through jet 163b. After take-off, crew vehicle nose gear 170 and crew vehicle main gear 172a and 172b are moved from the deployed position to the stowed position.

Flight vehicle 100 moves to a desired altitude in response to the thrust of jets 163a. It should be noted that the operation of rockets 164a and 164b and jets 163a and 163b is controllable from capsule assemblies 140a and/or 140b. At this desired altitude, jet 163a ceases thrust and rocket 164a initiates thrust. Jet or ramjets provide more efficient thrust with atmospheric oxygen, while only rockets use on-board oxygen and provide thrust outside the atmosphere.

At a higher altitude, flight vehicle 100 moves from the coupled condition to the uncoupled condition. Flight vehicle 100 can move from the coupled condition to the uncoupled condition in many different ways. In this embodiment, crew vehicle brackets 173a and 173b disengage launch vehicle main gear housing fronts 138a and 138b, respectively. In this embodiment, launch vehicle 110 slides away from the rearward end of crew vehicle 150 so that launch vehicle nose 113 slides away from crew propulsion system exhaust 162 and away from between crew vehicle stabilizers 157a and 157b and away from between flap 158 and crew propulsion system exhaust 162 in response to flight vehicle 100 moving from the coupled condition to the uncoupled condition.

In response to flight vehicle 100 moving from the coupled condition to the uncoupled condition crew vehicle brackets 173a and 173b and launch vehicle main gear housing fronts 138a and 138b are moveable between engaged and disengaged positions with each other.

Launch vehicle 110 and/or crew vehicle 150 can include one or more systems for moving flight vehicle 100 from the coupled condition to the uncoupled condition. For example, in some embodiments, crew vehicle 150 includes a pneumatic system which thrusts launch vehicle 110 away. In some embodiments, crew vehicle 150 includes a mechanical release for releasing launch vehicle 110. Pneumatic, pyrotechnic and mechanical systems are typically used in the space industry to separate one craft from another during flight. Examples of systems for separating one craft from another during flight are disclosed in the above-identified references.

As mentioned above, flap 158 is positioned proximate to a lower portion of launch vehicle nose 113, as shown in FIGS. 1g and 1h. Hence, launch vehicle 110 is moved away from the rearward end of crew vehicle 150 so that the lower portion of launch vehicle nose 113 is moved away from flap 158 in response to flight vehicle 100 moving from the coupled condition to the uncoupled condition.

As mentioned above, crew vehicle ailerons 156a and 156b are positioned proximate to leading edges 119a and 119b, respectively, of corresponding launch vehicle wings 115a and 115b (FIG. 1h). Hence, launch vehicle wings 115a and 115b move away from crew vehicle ailerons 156a and 156b, respectively, in response to flight vehicle 100 moving from the coupled condition to the uncoupled condition. Further, leading edges 119a and 119b move away from crew vehicle ailerons 156a and 156b in response to flight vehicle 100 moving from the coupled condition to the uncoupled condition.

As mentioned above, fairing 105 is positioned proximate to crew propulsion system exhaust 162 and launch vehicle nose 113. Launch vehicle nose 113 moves away from fairing 105 in response to flight vehicle 100 moving from the coupled condition to the uncoupled condition. Further, fairing 105 moves away from crew vehicle 150 in response to flight vehicle 100 moving from the coupled condition to the uncoupled condition. In particular, fairing 105 moves away from crew propulsion system exhaust 162 in response to flight vehicle 100 moving from the coupled condition to the uncoupled condition. Fairing is allowed to reenter the atmosphere and burn up on reentry, being of light material construction.

In the uncoupled condition, the altitude of launch vehicle 110 is reduced and the thrust provided by jet 163a of launch vehicle 110 is used so that launch vehicle 110 can land under its own power. Launch vehicle nose gear 130 and launch vehicle main gear 132a and 132b are moved to the deployed position in response to a landing indication. Launch vehicle main gear 132a and 132b are moved forward to the appropriate landing position just behind the center of gravity per FIG. 2e.

In the uncoupled condition, the thrust provided by rocket 164b of crew vehicle 150 is increased so that crew vehicle 150 climbs. Rocket 164b provides thrust so that crew vehicle 150 can climb to a desired orbit or suborbital trajectory. At the desired orbit, the thrust provided by rocket 164b is terminated.

Crew vehicle 150 can return from orbit in many different ways, such as those disclosed in U.S. Pat. Nos. D302,148, 3,369,771, 3,700,193, 3,702,688 4,452,412, 5,564,653, which are related to the space shuttle. In one embodiment of returning from orbit, crew vehicle 150 is oriented so that crew vehicle nose 153 faces away from the direction of flight. Crew propulsion system 160 provides thrust, such as by using rocket 164b, so that the speed of crew vehicle 150 is reduced in response and the orbit of crew vehicle 150 is reduced so that it enters the upper atmosphere. The thrust provided by crew propulsion system 160 is terminated. Crew vehicle 150 is re-oriented by attitude control thruster rockets so that crew vehicle nose 153 faces the direction of flight.

Flap 158 is adjusted to a high angle of attack of crew vehicle 150 so that it can safely enter the atmosphere and increase drag so that it slows down. Crew vehicle 150 typically performs a series of S-shaped banking turns to further reduce speed.

Flap 158 is adjusted to reduce the angle of attack after crew vehicle 150 is in the atmosphere. Intake shrouds 165a and 165b are moved from the closed position to the open position so that the thrust of jet 163b can be increased by allowing the atmosphere to flow through jet 163b. The thrust provided by jet 163b is initiated so that crew vehicle 150 is capable of making a powered landing. Crew vehicle nose gear 170 and crew vehicle main gear 172a and 172b are moved to the deployed position in response to a landing indication.

Figure 4A:
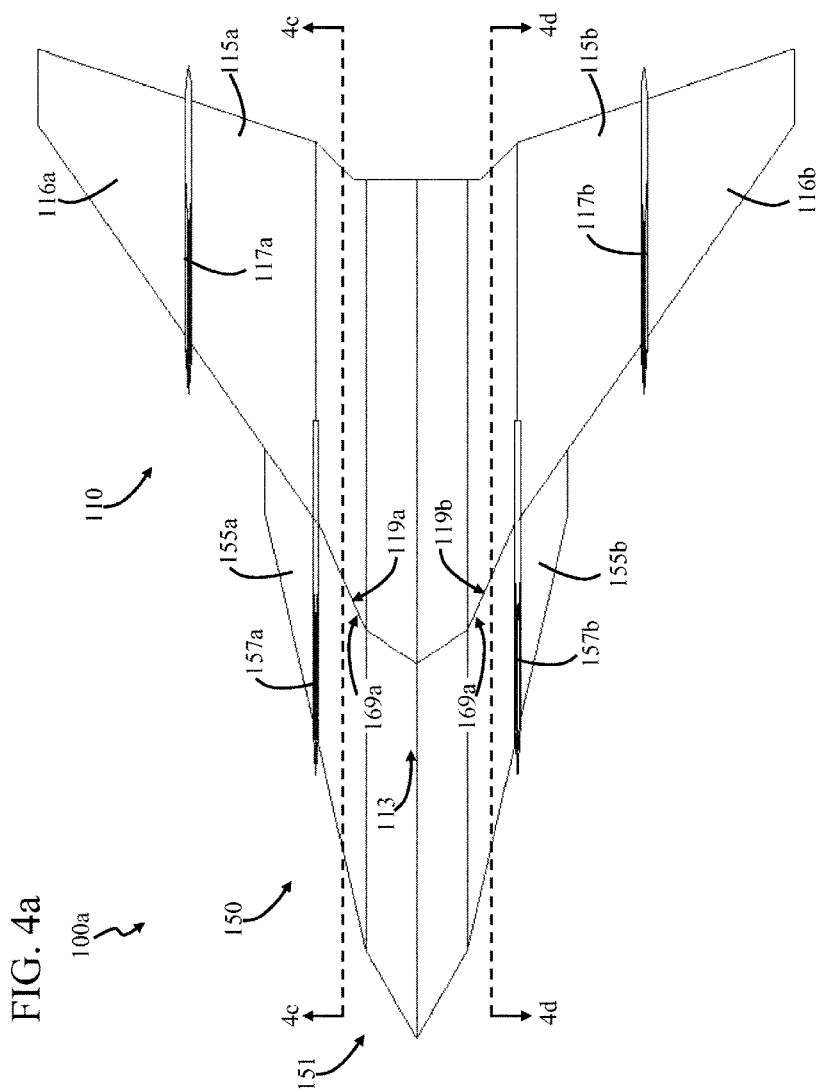
FIG. 4a is a top plan view of another embodiment of a flight vehicle.
Figure 4B:
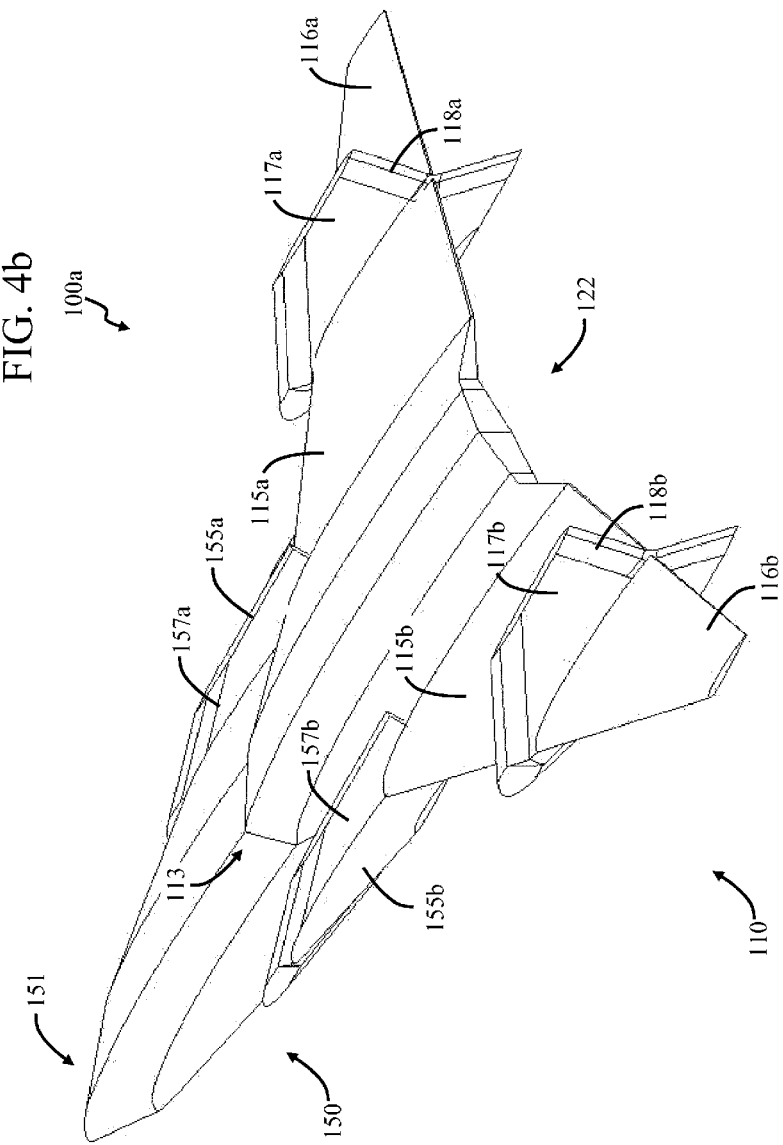
Figure 4C:
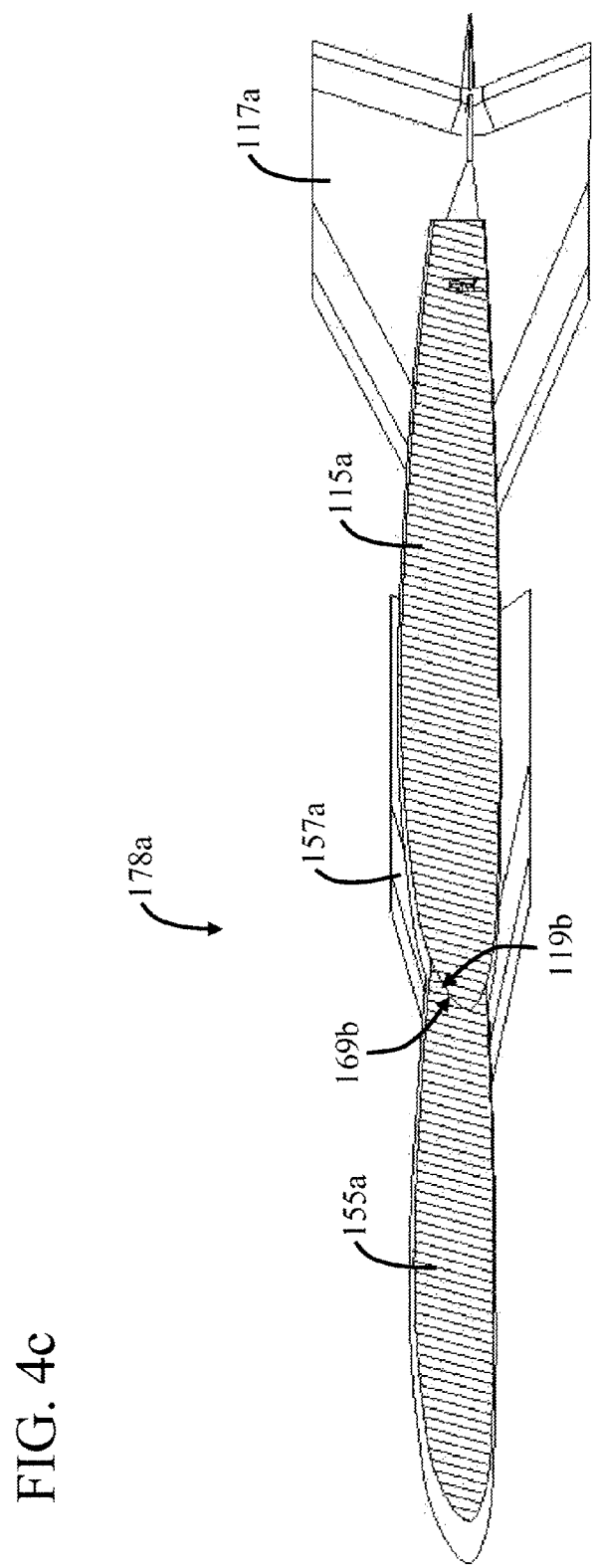
Figure 4D:
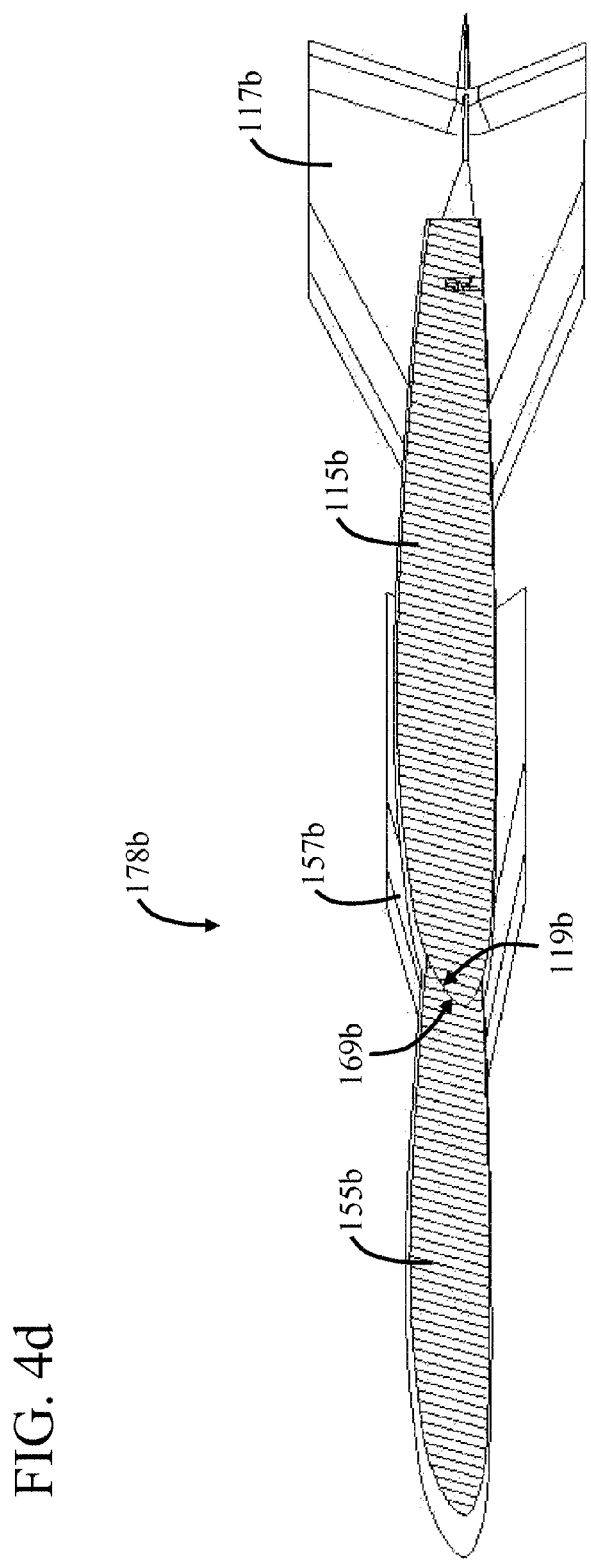

FIG. 4a is a plan view of another embodiment of a flight vehicle 100a, and FIG. 4b is a perspective view of flight vehicle 100a. FIG. 4c is a cut-away side view of flight vehicle 100a taken along a cut-line 4c-4c of FIG. 4a, and FIG. 4d is a cut-away side view of flight vehicle 100a taken along a cut-line 4d-4d of FIG. 4a.

In this embodiment, flight vehicle 100a includes launch vehicle 110 and orbiter vehicle 150, which are repeatably moveable between coupled and uncoupled conditions with each other, as described in more detail above. It should be noted that flight vehicle 100a includes many of the same components as flight vehicle 100, so that the same numbering for the same components is used. Further, flight vehicle 100a is shown in the coupled condition in FIGS. 4a, 4b, 4c and 4d.

In this embodiment, orbiter vehicle 150 includes wings 155a and 155b having trailing edges 169a and 169b, respectively. It should be noted that trailing edges 169a and 169b can correspond to edges of a control surface, such as an aileron, if desired. In this embodiment, launch vehicle 150 includes wings 115a and 115b having leading edges 119a and 119b.

In this embodiment, wings 115a and 155a operate as a single airfoil 178a (FIG. 4c) when launch vehicle 110 and orbiter vehicle 150 are in the coupled condition. Wings 115a and 155a can operate as a single airfoil in many different ways. In some embodiments, trailing edge 169a is proximate to leading edge 119a when launch vehicle 110 and orbiter vehicle 150 are in the coupled condition. Trailing edge 169a is proximate to leading edge 119a so that the atmosphere is restricted from flowing between them. In some embodiments, trailing edge 169a engages leading edge 119a when launch vehicle 110 and crew vehicle 150 are in the coupled condition. Trailing edge 169a engages leading edge 119a so that the atmosphere is restricted from flowing between them. In this way, wings 115a and 155a operate as a single airfoil.

In this embodiment, wings 115b and 155b operate as a single airfoil 178b (FIG. 4d) when launch vehicle 110 and crew vehicle 150 are in the coupled condition. Wings 115*b* and 155*b* can operate as a single airfoil in many different ways. In some embodiments, trailing edge 169*b* is proximate to leading edge 119*b* when launch vehicle 110 and orbiter vehicle 150 are in the coupled condition. Trailing edge 169*b* is proximate to leading edge 119*b* so that the atmosphere is restricted from flowing between them. In some embodiments, trailing edge 169*b* engages leading edge 119*b* when launch vehicle 110 and orbiter vehicle 150 are in the coupled condition. Trailing edge 169*b* engages leading edge 119*b* so that the atmosphere is restricted from flowing between them. In this way, wings 115*b* and 155*b* operate as a single airfoil.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. An in-line staged flight vehicle comprising:
   (i) a launch vehicle, the launch vehicle comprising:
      (a) a launch vehicle body, the launch vehicle body comprising:
         (i) a launch vehicle front portion; comprising: a launch vehicle front bottom portion;
         (ii) a launch vehicle rear portion; and
         (iii) at least one launch vehicle airfoil; and
      (b) a launch vehicle propulsion system;
      wherein the at least one launch vehicle airfoil is configured to generate lift; and
      wherein the launch vehicle propulsion system is attached to a portion of the launch vehicle and configured to facilitate powered flight of the flight vehicle; and
   (ii) a crew vehicle, the crew vehicle comprising:
      (a) a crew vehicle body, the crew vehicle body comprising:
         (i) a crew vehicle front portion;
         (ii) a crew vehicle rear portion comprising: a rear opening; and
         (iii) at least one crew vehicle airfoil; and
      wherein the at least one crew vehicle airfoil is configured to generate lift;
      wherein the rear opening is configured to receive the launch vehicle front bottom portion; and
      wherein the launch vehicle is configured to takeoff horizontally;
      wherein the crew vehicle is configured to takeoff horizontally;
      wherein the launch vehicle and the crew vehicle are moveable between a coupled condition and an uncoupled condition;
      wherein the launch vehicle and the crew vehicle may move from the coupled condition to the uncoupled condition during flight;
      wherein, in the coupled condition, during atmospheric flight, the launch vehicle body and the crew vehicle body generate lift for the flight vehicle;
      wherein, in the coupled condition, the launch vehicle and the crew vehicle are staged in-line such that the launch vehicle front portion is removably connected to the crew vehicle rear portion and the launch vehicle and the crew vehicle are aligned along a common centerline; and
      wherein in the coupled condition, a leading edge of the at least one launch vehicle airfoil is adjacent to a trailing edge of the at least one crew vehicle airfoil.

2. The in-line staged flight vehicle of claim 1, wherein at least one of the launch vehicle and the crew vehicle is an unmanned vehicle.

3. The in-line staged flight vehicle of claim 1, wherein the launch vehicle is configured to land horizontally and the crew vehicle is configured to land horizontally.

4. The in-line staged flight vehicle of claim 1, wherein: the at least one crew vehicle airfoil is a wing; and
the at least one launch vehicle airfoil is a wing.

5. The in-line staged flight vehicle of claim 1, wherein at least one of the crew vehicle and the launch vehicle is configured as one of: a flying wing; a lifting body; and a blended wing.

6. The in-line staged flight vehicle of claim 1, wherein the launch vehicle and the crew vehicle are configured to form a single airfoil when the launch vehicle and the crew vehicle are in the coupled condition.

7. The in-line staged flight vehicle of claim 6, wherein when the crew vehicle and the launch vehicle are in the coupled condition, the flight vehicle is configured as one of: a flying wing; a lifting body; and a blended wing.

8. The in-line staged flight vehicle of claim 1, wherein the crew vehicle further comprises:
a crew vehicle propulsion system attached to a portion of the crew vehicle and configured to facilitate powered flight of the crew vehicle.

9. The in-line staged flight vehicle of claim 8, wherein at least one of the launch vehicle propulsion system and the crew vehicle propulsion system comprise at least one of: a turbojet engine; a turbofan engine; a liquid propellant rocket engine; a solid propellant rocket motor; a ram jet engine; and a scramjet engine.

10. The in-line staged flight vehicle of claim 1, wherein at least one of the launch vehicle and the crew vehicle further comprise:
at least one control surface, configured to facilitate maneuvers during atmospheric flight.

11. The in-line staged flight vehicle of claim 1, wherein:
the launch vehicle further comprises a liquid propellant tank; and
the flight vehicle, when in a coupled condition, further comprises:
a flight vehicle center of mass;
wherein the liquid propellant tank is configured to supply a liquid propellant to the launch vehicle propulsion system; and
wherein the liquid propellant tank is positioned at the launch vehicle front portion such that the liquid propellant tank is coextensive with the flight vehicle center of mass.

12. The in-line staged flight vehicle of claim 1, wherein the crew vehicle is one of:
a sailplane;
a weapons carrier;
an orbital spacecraft;
a suborbital spacecraft;
a cruise missile;
a suborbital transport;
an orbital transport;
a crewed vehicle;
an unmanned vehicle;
an unmanned surveillance vehicle; and
an aerial refueling vehicle.

13. The in-line staged flight vehicle of claim 1, wherein the crew vehicle is configured as an expendable vehicle.

14. The in-line staged flight vehicle of claim 1, wherein the crew vehicle further comprises at least one explosive device.

15. The in-line staged flight vehicle of claim 1, wherein the crew vehicle is configured to take off only when in the coupled condition.

16. The in-line staged flight vehicle of claim 1, wherein
the crew vehicle further comprises: a payload bay; and a payload release mechanism; wherein the payload bay is configured to house a payload; and
wherein the payload release mechanism is configured to facilitate release of the payload at a predetermined altitude.

17. The in-line staged flight vehicle of claim 1, wherein the crew vehicle rear portion is shaped to conform to the launch vehicle front portion.

18. A method of launching an in-line staged flight vehicle wherein the flight vehicle is configured to takeoff horizontally and comprising: a launch vehicle, the launch vehicle comprising: a launch vehicle body, configured to generate lift; a launch vehicle front portion comprising a launch vehicle front bottom portion, a launch vehicle rear portion, at least one launch vehicle airfoil; and a launch vehicle propulsion system; configured to facilitate powered flight of the flight vehicle; and a crew vehicle, the crew vehicle comprising: a crew vehicle body, configured to generate lift; a crew vehicle front portion; and a crew vehicle rear portion comprising a rear opening; at least one crew vehicle airfoil wherein the launch vehicle and the crew vehicle are removably connected and moveable between a coupled condition and an uncoupled condition, wherein the rear opening is configured to receive the launch vehicle front bottom portion; in the coupled condition, the launch vehicle and the crew vehicle are staged in-line such that the launch vehicle front portion is removably connected to the crew vehicle rear portion and the launch vehicle and the crew vehicle are aligned along a common centerline; wherein in the coupled condition, a leading edge of the at least one launch vehicle airfoil is adjacent to a trailing edge of the at least one crew vehicle airfoil; and the crew vehicle may move from the coupled condition to the uncoupled condition during flight, the method comprising the steps of:
(a) operating the flight vehicle to accomplish a horizontal takeoff from a runway;
(b) flying the flight vehicle to a predetermined altitude;
(c) disconnecting the crew vehicle from the launch vehicle upon reaching a predetermined altitude; and
(d) flying the crew vehicle and the launch vehicle independently of each other.

19. The method of claim 18, further comprising the steps of:
(e) flying the crew vehicle to space; and
(f) landing the launch vehicle horizontally on a runway.

* * * * *